US 6,584,507 B1

(12) United States Patent
Bradley et al.

(10) Patent No.: US 6,584,507 B1
(45) Date of Patent: Jun. 24, 2003

(54) LINKING EXTERNAL APPLICATIONS TO A NETWORK MANAGEMENT SYSTEM

(75) Inventors: Karen A. Bradley, San Jose, CA (US); Brian D. Promes, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/260,119

(22) Filed: Mar. 2, 1999

(51) Int. Cl.[7] .............................................. G06F 15/16
(52) U.S. Cl. ...................... 709/229; 709/220; 709/223; 709/226; 709/239; 709/227; 710/36; 713/1
(58) Field of Search .............................. 709/226, 222, 709/104, 100, 220, 223, 227, 229, 239; 707/10, 200; 714/38; 345/753; 710/36; 713/1

(56) References Cited

U.S. PATENT DOCUMENTS

| | | | |
|---|---|---|---|
| 5,689,708 A | * 11/1997 | Regnier et al. | 709/104 |
| 5,729,682 A | * 3/1998 | Marquis et al. | 709/100 |
| 5,838,916 A | * 11/1998 | Domenikos et al. | 709/219 |
| 5,841,972 A | * 11/1998 | Fanshier | 709/220 |
| 5,859,978 A | * 1/1999 | Sonderegger et al. | 707/10 |
| 5,893,118 A | * 4/1999 | Sonderegger | 707/200 |
| 6,002,871 A | * 12/1999 | Duggan et al. | 714/38 |
| 6,006,035 A | * 12/1999 | Nabahi | 717/175 |
| 6,052,719 A | * 4/2000 | Bezanson et al. | 709/220 |
| 6,073,172 A | * 6/2000 | Frailong et al. | 709/220 |
| 6,094,679 A | * 7/2000 | Teng et al. | 709/220 |
| 6,134,549 A | * 10/2000 | Regnier et al. | 345/753 |
| 6,449,642 B2 | * 9/2002 | Bourke-Dunphy et al. | 709/222 |
| 2001/0044839 A1 | * 11/2001 | Bourke-Dunphy et al. | 709/222 |

OTHER PUBLICATIONS

Microsoft Corporation, Jan. 1999, "BackOffice Server 4.5 Product Preview Customer Q&A", TechNet Home page.*

* cited by examiner

Primary Examiner—Kenneth R. Coulter
Assistant Examiner—Hai V. Nguyen
(74) Attorney, Agent, or Firm—Hickman Palermo Truong & Becker LLP

(57) ABSTRACT

A method and apparatus for linking external information to a network management system are disclosed. A network management system is installed for and executes in association with a managed network. An external application program is identified by defining and storing in a connection file information that describes: the name and location of the program; a position in a menu control tree into which folders and items, which identify functions and options of the external application program, should be displayed and accessed; security roles associated with each folder and item; and other meta-information about the application program and its maker. The information may be stored in a markup format in a connection file. The network management system reads the connection file and integrates the information into its registry and other locations that determine how the network management system operates. As a result, a third-party application may be integrated into a principal network management system, even after the network management system is installed an executing. Further, the connection file need not be rewritten and the application need not be re-installed even when changes occur in underlying structures of the network management system, such as its registry or help system.

21 Claims, 18 Drawing Sheets

Select Management Connection File
(Cisco Network Management Partner Products)

The following management connection files have been certified for integration with Resource Manger Essentials. Locate the specific application you wish to connect to and click its connection file icon.

Note: For proper installation of a connection file, its specific application must already be installed on your network and you must know the name of the server on which it is installed.

| Company Name | Application | | Connection File |
|---|---|---|---|
| | Name | Version | |
| Apogee Networks, Inc. | NetCountant | 2.1 | 🗋 |
| Fujitsu Limited | System Walker/CentricMGR | 4.0 | 🗋 |
| Hewlett-Packard | HP OV NetMetrix Reporter | 5.0 | 🗋 |
| Hewlett-Packard Company | HP OpenView Network Node Manager | 5.0 | 🗋 |

FIG. 3G

LINKING EXTERNAL APPLICATIONS TO A NETWORK MANAGEMENT SYSTEM

FIELD OF THE INVENTION

The present invention generally relates to data processing in the field of management of computer networks, and relates more specifically to linking external program applications to a network management system that is installed and executing in a managed network.

BACKGROUND OF THE INVENTION

A computer network generally includes a number of network devices, such as switches, routers, and others, as well as end station devices such as desktop machines, servers, hosts, printers, fax machines, and others. In order for the computer network to function properly, network administrators monitor the various devices, deploying new devices or upgrading existing ones in the network. In addition, the network administrator is responsible for configuration management of the network and manages distribution of software on the network. Typically, a network administrator employs a network management system to accomplish such tasks.

The network management system is a software program, or a combination of hardware and software, that can interrogate the network, present management information, and carry out changes in the network. An example of a commercially available network management system is Cisco Resource Manager, commercially available from Cisco Systems, Inc., San Jose, Calif. This type of network management system may be used to manage a network owned or operated by a large business or institution ("enterprise").

Many enterprise networks now use and are often an integral part of the global, packet data network known as the Internet, and its hypertext services and facilities that are known as the World Wide Web. Many computer programs for particular tasks ("applications") can be made available for use through the World Wide Web if they can be effectively accessed. For example, a Web-based network management system that is installed and executing in a managed network of an enterprise can be enhanced by linking it to other, external Web-based network management applications and tools that complement the principal network management system. An example of an external application is OpenView, commercially available from Hewlett-Packard Company, Palo Alto, Calif.

It is desirable to enable parties other than the manufacturer or vendor of the principal network management system, including the enterprise itself, to develop new applications and tools and connect them to the principal network management system. However, oftentimes, the external applications and tools do not inter-operate properly.

In one approach, to link the external web-based network management applications, engineers associated with the external application developer, the vendor, or the enterprise had to undertake significant, tedious, customized work. For example, the engineers had to build "install" routines, study and modify complex registry files or configuration files, and provide technical support to the enterprise, third party application developers, or end users. The effort had to be repeated with each change in the enterprise's network system. Thus, there had to be on-going maintenance and support to integrate or to link to the applications.

Another problem of this approach is that the routines and changes to the files could not be shared. Each time that a third party desired to connect its external application to a copy of the principal network management application of a different enterprise, the routines and changes to the configuration files had to be copied to that enterprise, installed, and tested.

Still another problem is if the underlying registry files and configuration files changed, the install routines and changes would not necessarily work. For example, if the vendor of the principal network management system released a new version of its system with modified registry file formats or contents, the third party application suddenly might not work because it had been connected to the old registry files or configuration files.

Moreover, each integration effort had to be packaged for the enterprise in a form that was comprehensible to its end users so they could carry out the integration.

Based on the foregoing, there is a need for a simple and inexpensive method or mechanism to automatically and correctly link external applications to enterprise network management systems.

There is also a need for a method or mechanism that minimizes the engineering and support effort required on the part of the manufacturer or vendor of the principal network management application to link Web-based external applications to the principal network management application. There is also a need for such a method or mechanism that is simple and inexpensive.

There is also a need for a method or mechanism that enables a third party to create and store a connection between the principal network management application and the Web-based external application, in which the connection continues to be valid even if the underlying registry syntax and structure changes.

There is also a need for a method or mechanism that enables such connections to be imported into or exported from the principal network management system, and generally shared across multiple installations.

SUMMARY OF THE INVENTION

The foregoing needs, and other needs and objectives that will become apparent from the description herein, are achieved by the present invention, which comprises, in one aspect, a method for linking an application program to a network management system having a hierarchical list of menu options. The menu options are defined by registry information stored in association with the network management system. The method may involve creating and storing, in association with the network management system, connection information that defines a connection between the application program and the network management system; modifying the registry information to add the connection information such that the application program is identified in a logical location in the list; and executing the application program by selecting it from the list from within the network management system.

One feature of this aspect includes creating and storing a connection file that defines one or more application menu options of the application program and one or more locations within the hierarchical list of the network management system into which the application menu options are to be stored.

According to another feature, the method further involves certifying that the connection information will correctly integrate the application program with the network management system before carrying out the modifying step; and storing and distributing, in association with the connection information, certifying information that identifies the connection as certified.

In another feature, the connection data file comprises data that ensures compatibility between the application program and the network management system and that defines one or more application menu options of the application program and one or more locations within the hierarchical list of the network management system into which the application menu options are to be stored. In another feature, the connection file is installed only when the connection file is certified and only when a Uniform Resource Locator in the data file that specifies a location of the application program is found to exist.

According to still another feature, certifying the connection information involves transmitting the connection information to a site associated with an owner of the network management system; at the site of the network management system, verifying that the connection file is complete; and storing the connection file and information concerning such verification in a database of the owner of the network management system. In another feature, certifying the connection further involves transmitting the connection file to a Certification Tester; and if the connection file is certifiable, then creating and storing, in association with the connection file at the site of the owner of the network management system, information indicating that the connection file has been certified; transmitting the connection file to a customer installation in association with the network management system; and installing the connection file in the network management system at the customer installation.

In another feature, the method involves creating and storing connection information that defines one or more application menu options of the application program and one or more locations within the hierarchical list of the network management system into which the application menu options are to be stored and that defines one or more links into the application program that may be launched from within the network management system.

According to yet another feature, the method involves displaying information generated by the application program within a frame of a graphical user interface that is generated by the network management system; selecting one or more application menu options of the application program from within the hierarchical list of the network management system; and displaying information generated by the application program within a frame of a graphical user interface that is generated by the network management system.

According to another feature, the method further involves creating and storing, in association with the network management system, connection information that defines a connection between the application program and the network management system, herein the connection information may include: an application name; a location identifier of a server that hosts the application program; and a name of a menu option of the network management system through which functions of the application program are to be accessed; names of one or more items within the menu option through which sub-functions of the application program are to be accessed; and, for each of the items, one or more security privilege designations that indicate which users may access the associated item.

Yet another feature involves connecting the application program to the network management system by importing connection information from previously stored connection information, by selecting the connection information to be imported from the certifying information.

According to another aspect, a computer system links an application program to a network management system and has a hierarchical list of menu options, in which the menu options are defined by registry information stored in association with the network management system. The computer system may comprise a company site associated with the network management system that comprises stored information identifying whether the application program is certified for use with the network management system; an application developer site coupled over a network to the company site and which comprises stored connection information that defines a connection between the application program and the network management system; and one or more software elements stored and executing at the company site and the application developer site, wherein the software elements cooperate to carry out the steps of: modifying the registry information to add the connection information such that the application program is identified in a logical location in the list; and executing the application program by selecting it from the list from within the network management system.

In one feature, the computer system mentioned above further comprises a Certification Tester site coupled over the network to the company site and which comprises means for testing and certifying whether the connection information operates correctly with the network management system, and means for communicating, in response thereto, certification information from the Certification Tester site to the company site.

According to another feature, the software elements cooperate to carry out processing steps. The steps may include communicating the stored connection information from the application developer site to the company site; at the company site, verifying that the connection information is complete; updating the information stored at the company site when the Certification Tester site communicates the certification information to the company site. In yet another feature, the computer system stores connection information that comprises one or more application menu options of the application program and one or more locations within the hierarchical list of the network management system into which the application menu options are to be stored.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3D shows an "Enter Item Information" dialog box;

FIG. 3G shows a "Select Management Connection " dialog box;

DETAILED DESCRIPTION OF THE PREFERRED EMBODIMENT

Figure 1:
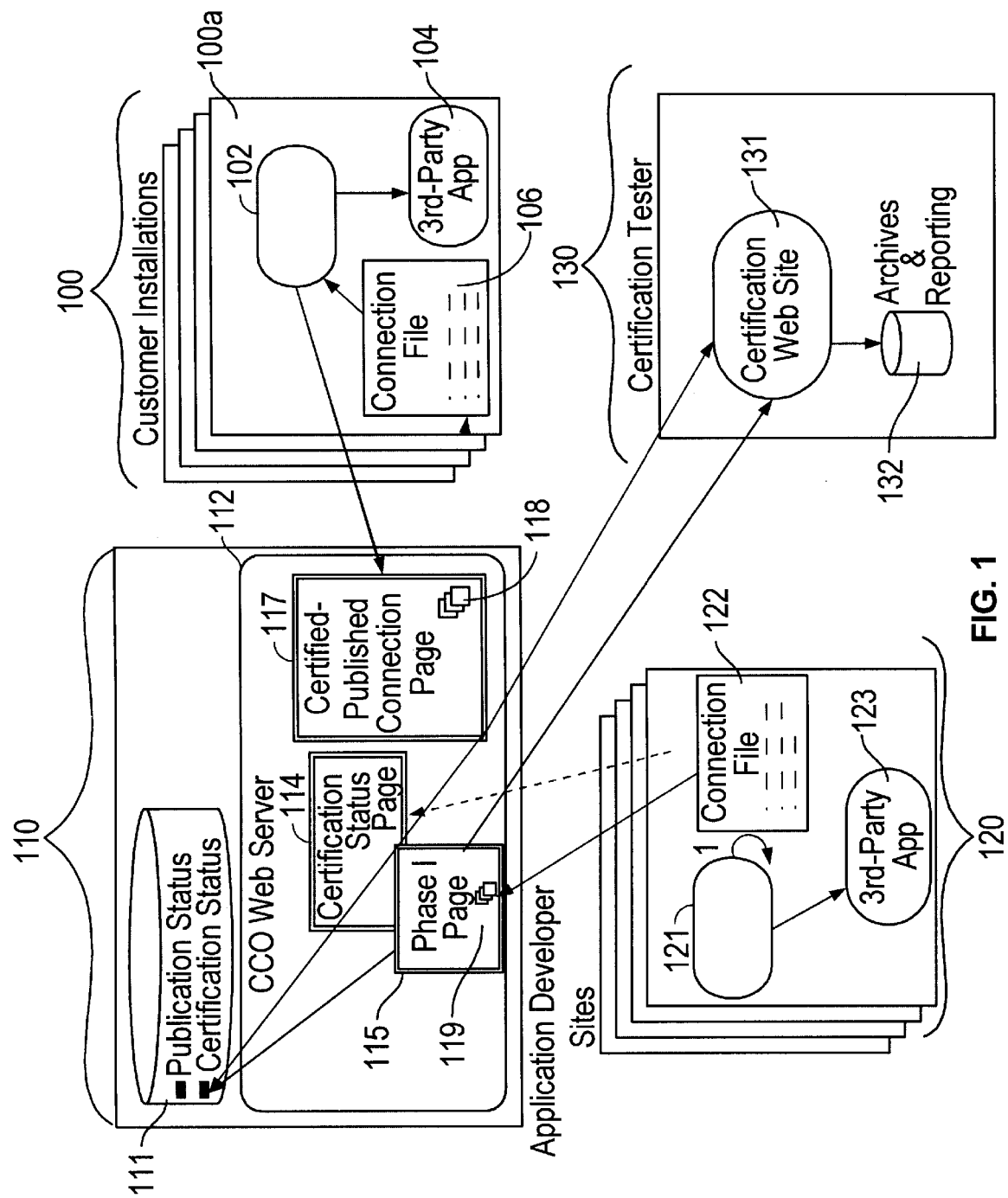
FIG. 1 is a block diagram that illustrates an overview of an embodiment.

A method and apparatus for linking external applications to a network management system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

STRUCTURAL AND FUNCTIONAL OVERVIEW

One embodiment involves a mechanism, method or system for connecting one or more external network management applications to a principal network management system.

Thus, in one embodiment, a vendor manufactures, supports or otherwise provides a principal network management system. The principal network management system is said to be "Web-based" because end users access it using a Web browser, executed by an appropriate client computer or workstation, to connect to pre-defined URLs that are associated with the system. An enterprise-class customer of the vendor buys, licenses, or installs the network management system. The customer may build an enterprise network management Intranet by connecting external third-party Web-based network management applications, or its own network management applications, to the principal network management systems. In this way, the external applications become accessible through the World Wide Web from the principal network management application.

The system minimizes engineering support overhead by enabling a developer of the external application to provide user help, technical support information or product information with respect to the application. Moreover, it will become apparent that the system minimizes the engineering and support effort required to integrate the Web-based network management applications and to make them operate together. For example, a "connection file" is created for a particular external application only once. Once created, the connection file will continue to be valid even when the underlying registry or configuration files of the principal network management system change in syntax or structure.

The principal network management system is also sometimes called a Resource Manager ("RM") application. In one embodiment, an end-user may navigate the network management system, using a Web browser, and bring up one or more hyperlinks, each of which is associated with and connected to an external network management application. Each hyperlink ("link") resides within the network management system and not within the Web browser. The links to the applications can be organized in a hierarchical list of folders and menus.

Each link may pass contextual data between Web-based applications. For example, suppose the network management system contains reports on a device in the network, such as a router. The reports on the router can be passed directly to the linked application for further processing. As a result, the linked application does not need to re-query the router to obtain the information used in the reports. Also, the link can be a two-way link. The reports on the router can be passed directly from the linked application to the network management system.

FIG. 1 is a block diagram of one embodiment of a mechanism for connecting an external application program 104 to a network management system 102. In this discussion, an external application is sometimes called a "third-party application," because it is developed, distributed and supported by a party other than the vendor of the network management system (first party), or the customer of the network management system and the external application (second party). The term "external" is intended to mean only that the external application is not normally shipped as an integral part of the network management system, e.g., the external application is logically separate from the network management system.

Generally, in this embodiment, the mechanism comprises a Company Site 110, one or more Customer Installations 100, one or more 3rd Party Application Developer Sites 120, and at least one Certification Tester 130, all of which interact and cooperate to carry out the functions of the mechanism. A 3rd-party application is made accessible using a "connection file" that associates the 3rd-party application with the principal network management system. Each connection file is created by either a 3rd-party application developer or the customer at their respective sites.

The Company Site 110 is associated with, owned or operated by an institution that provides or supports a network management system. The Company Site 110 may have a Web Server 112 that is coupled to a database 111. The Web Server 112 acts as a central publication location for information about the network management system and 3rd-party applications that are linked to it. The database 111 stores information about which 3rd-party applications have been published, and whether they have been externally certified as correct. Further information about the certification process is provided below. An example of a Web site that may be configured to operate as a Company Site 110 is Cisco Connection Online, http://www.cisco.com/, owned and operated by Cisco Systems, Inc. of San Jose, Calif.

The Web Server 112 may comprise a certification status page 114, a Phase I Page 115, and a Certified-Published Connection Page 117. Certification status page 114 may display a list of the current certification status information for each of the 3rd-party applications, based on the information in the database 111. Thus, by directing a Web browser to certification status page 114, a customer or user may obtain a display of current certification information from database 111. In one embodiment, a customer may obtain a display current certification information by using a "view certification status" link from the customer's network management system. The customer's network management system is described further below.

The term "Phase I" refers to a preliminary verification process. The Phase I Page 115 may contain or refer to one or more Connection Files 119. Each Connection File 119 is created by one of the 3rd Party Application Developer Sites 120 and uploaded to the Phase I Page 115. Thus, each Connection File 119 represents a connection of a 3rd Party application that has been proposed by the developer of such application, but not yet tested, certified for use by Customer Installations 100, or published to such customers.

The Certified-Published Connection Page 117 may display a list of 3rd-party applications that have been certified and published to customers of the network management system. Preferably, the Certified-Published Connection Page 117 includes one or more Certified Connection Files 118, each of which associates a 3rd-party application with the network management system. In this context, "includes" means to contain or to contain a hyperlink that directs a user or a browser to the Connection Files 118.

Each of the Customer Installations 100 is associated with a customer of the Company Site 110. A customer may be an individual, a business enterprise, or any other entity or institution. Each of the Customer Installations 100 includes an operating copy of the network management system, one or more 3rd-party applications, and connections between the applications and the system. For example, Customer Installation 100a includes network management system 102, external application program 104, and Connection File 106. Network management system 102 executes and runs in the customer's network as its principal network management system. A user of network management system 102 may cause it connect to the Certified-Published Connection Page 117, for example, over the World Wide Web, to obtain a display of those 3rd-party applications that are approved for use with the network management system. The user may also use an external application program 104 by selecting a link or other reference to the application from a display or menu of the network management system 102. The network management system 102 refers to Connection File 116 to determine how to inter-operate with the external application program 104.

Each 3rd-party application Developer Site 120 may include network management system 121, one or more 3rd-party applications 123, and one or more Connection Files 122, each of which is associated with one of the 3rd-party applications. Network management system 121 is a copy of the same network management system as used for network management system 102 of Customer Installation 100a.

The Certification tester 130 may comprise a Certification Web Site 131, and an archive and reporting database 132. The Certification Web Site 131 carries out performance certification and testing of a 3rd-party application. Information about past and ongoing certification activities is stored in database 132. The purpose of the Certification tester 130 is to impartially determine whether a 3rd-party application, such as application 123, operates and interacts properly and successfully with the network management system, such as network management system 102, 121. Thus, involvement of a fourth-party Certification Tester effectively allows the third-party application developer, or the Company Site 110, to publish a connection for use by customers who have both network management system 102 and a copy of the third-party application.

Operation of a system having this structure may proceed as follows. At the 3rd-party application Developer Site 120, a developer obtains and installs a set of Management Connection software programs and related files ("Management Connection toolkit"). The Management Connection toolkit converts or enables the developer's network management system 121 to carry out integration of external applications. The developer uses the enhanced network management system 121 to create a Connection File 122 for its specific external application program 123. The foregoing step of converting or enhancement is not required, an in an alternate embodiment, the network management system 121 inherently includes the capability to create connections in the manner described further below.

Once the Connection File 122 is created, the developer may request preliminary ("Phase I") verification of the external application program 123. For example, the developer may connect to Company Site 110 and upload the Connection File 122 to Web Server 112. Phase I Page 115 of FIG. 1 can contain uploaded connection files 119 from various 3rd-party application developer sites 120. Because the connection files 119 are small, as will be described further below, they may be uploaded by passing a single URL-encoded string as the value in a Common Gateway Interface (CGI) post data field. CGI is a well-known specification for transferring information between a World Wide Web server and any computer program that conforms to the CGI standard. In this embodiment, the network management system 121 conforms to CGI. The Company Site 110 then carries out Phase I verification, in which the uploaded connection files 119 are examined to ensure validity and completeness.

After phase I verification, the developer may choose to continue the certification process. For example, Connection File 119 is sent to a Certification Tester 130 by uploading the connection file to Web Site 131. An example of a Certification Tester is KeyLabsTM, Inc. In addition, the Connection File 119 along with its publication approval status is saved in the database 111 to be used for testing against other applications that are submitted to Company Site 110.

Initially, the publication approval status of any 3rd-party application is set to "Unpublished Awaiting Certification" and stored in database 111. The developer can view the publication status and certification status of any connection that the developer has sent to Company Site 110, at any time. For example, one of the 3rd-Party Application Developer Site 120 may use RM to connect to the certification status page 114 at Company Site 110.

When a Connection File 122 passes testing at the Certification Tester 130, the Certification Tester notifies the Company Site 110. In response, Company Site changes the publication approval status of that application to "Certified" and stores the updated status value in database 111. If the Connection File 122 fails testing, the Certification Tester 130 or the Company Site 110 may notify the 3rd-party application developer of problems that occurred. Normally, the application developer will fix and re-submit the connection file for testing and certification.

After the connection file is certified, it may be published at Certified Published Connection Page 117, which enables Certified Connection Files 118 to be accessed by a customer. Thus, a customer who has the network management system 102 and a 3rd-party application can now link that application to the network management system. The customer connects to Company Site 110 to download Certified Connection File 118 for their specific external application program 104. As a result, Connection File 106 is stored at Customer Installation 100a.

The customer also obtains a copy of the Management Connection toolkit from Company Site 110. The Connection File 106 is installed using the Management Connection toolkit. The installation process causes one or more Uniform Resource Locator ("URL") connections to be added to a function menu or "control tree") of the customer's copy of the network management system 102. The function menu or control tree is a hierarchical list of menu options of the network management system 102. The connections may be in the form of one or more hyperlinks, menu options, etc. By selecting a connection within the network management system 102, the customer can execute the 3rd-party application or link to the Web site of the 3rd-party developer directly from the network management system.

The foregoing step of using the Management Connection toolkit to install the Connection File 106 is not required. In an alternate embodiment, the customer's network management system 102 inherently includes the capability to create connections as described above.

When the connection file is installed, in the preferred embodiment, all the application registry changes are handled by the network management system, including: generation of application links; and generation of a HELP page about the external application, which may be accessed if something goes wrong with the application. The HELP page also assists the vendor of the network management system by diverting support inquiries about a third-party application to the third-party company rather than to the vendor.

The foregoing process can apply to an enterprise that develops its own applications. For example, the enterprise may have its own in-house applications or may have purchased applications from developers who have not created connections to the network management system. In these cases, the enterprise can create its own connection files using the process outlined above.

CREATING CONNECTIONS

Figure 2A:
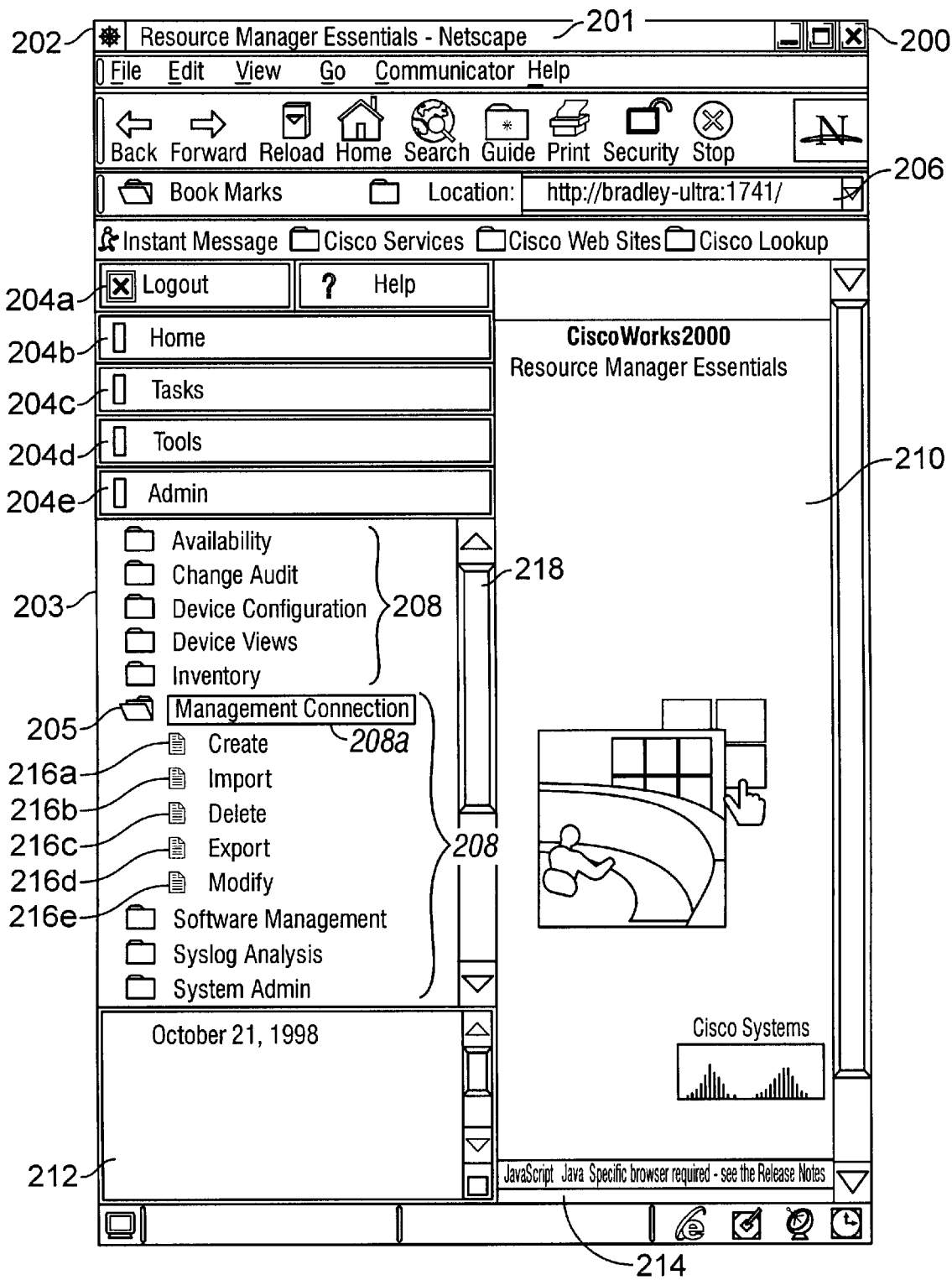
FIG. 2A illustrates an exemplary graphical user interface of a network management application that offers options relating to linking external information.
Figure 2B:
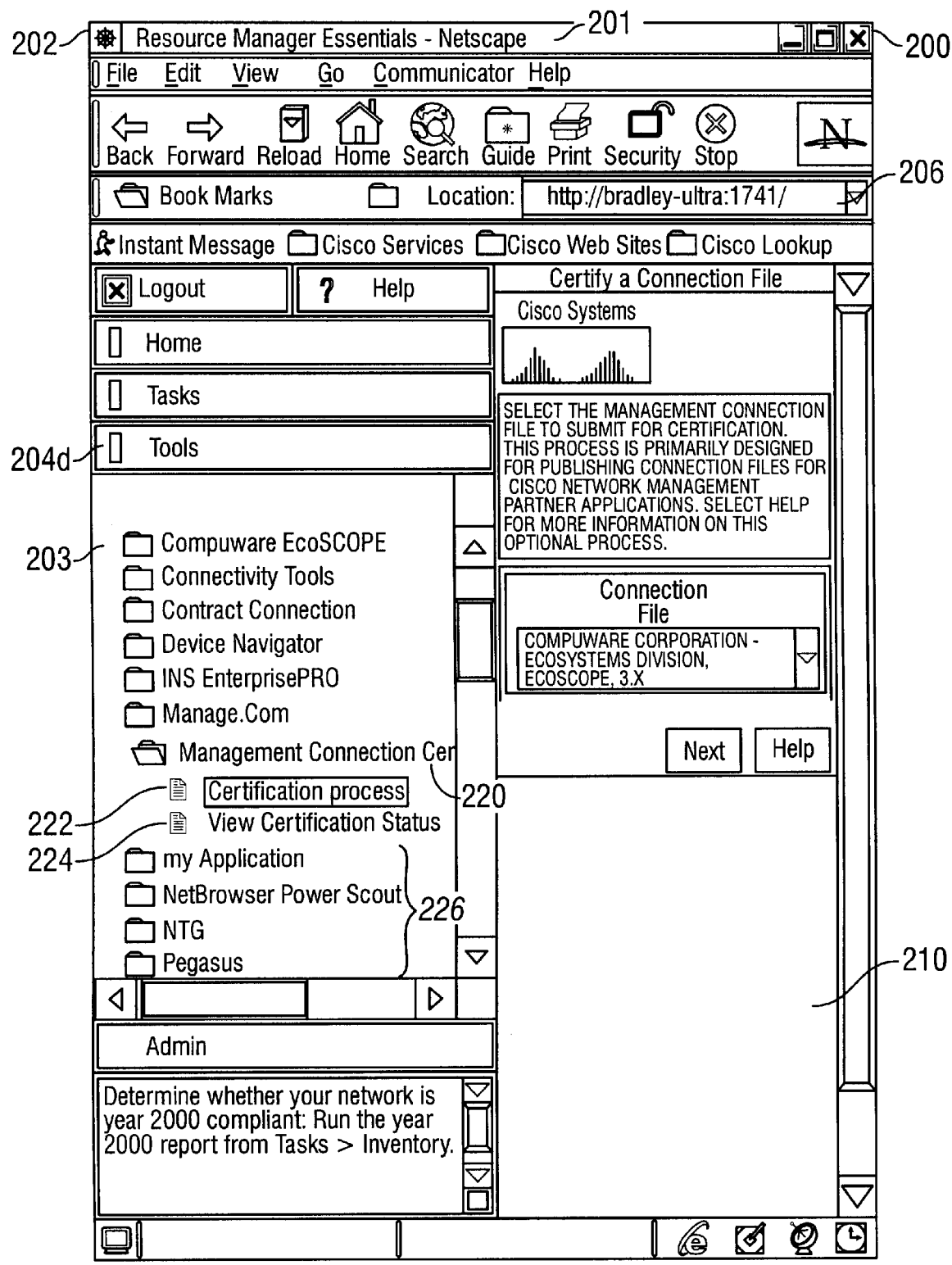
FIG. 2B illustrates another display of the graphical user interface of FIG. 2A.

A process of creating a connection between a network management system and a 3rd-party application is now described with reference to FIG. 2A, FIG. 2B, FIG. 3A, FIG. 3B, FIG. 3C, and FIG. 3D.
GRAPHICAL USER INTERFACE FIG. 2A and FIG. 2B illustrate a graphical user interface (GUI) generated by network management system 102 when executing at Customer Installation 100a. The network management system 102 is a Web-based network management application that has been transformed by the installation of the Management Connection toolkit. An example of a suitable network management application is Cisco works 2000, Resource Manager Essentials, commercially available from Cisco Systems, Inc.

In FIG. 2A, the GUI includes window 200 having title bar 202, which illustrates that the network management system 102 is named "Resource Manager Essentials", and that the Netscape browser 201 is being used to access and navigate within the network management system. Under control of network management system 102, the browser also displays a control tree 203, main pane 210, help window 212, and program control window 214.

Control tree 203 includes a LOGOUT option 204a, HOME option 204b, TASKS option 204c, TOOLS option 204d, and ADMIN option 204e. Each of the options 204a–204e includes one or more sub-options that may be displayed by activating the associated option 204a–204e, for example, by clicking on it with a mouse of the computer that is executing the browser. For example, ADMIN option 204e includes a plurality of sub-options 208. One of the sub-options 208 is a Management Connection folder 205, which further contains sub-folder options. In this example, the sub-folder options include a CREATE option 216a, IMPORT option 216b, DELETE option 216c, EXPORT option 216d, and MODIFY option 216e. Thus, the menu options, sub-options, folders, and sub-folder options form a hierarchical tree of functions, each of which may be selected and activated individually. The control tree 203 may be scrolled up and down to reveal additional options by activating scroll bar 218.

Main pane 210 displays text or graphics that comprise the results of executing operations selected from the control tree 203. Help window 212 displays messages that assist a user in working with the network management system 102. Program control window 214 displays messages, prompts, and other output produced by program components of the network management system 102, such as JAVA(R) applets.

FIG. 2B generally shows the same structure FIG. 2A, but illustrates a different part of the control tree 203. Specifically, FIG. 2B shows a Management Connection Certification folder 220 that is located within the TOOLS option 204d. Management Connection Certification folder 220 includes a Certification Process sub-folder option 222 and a View Certification Status sub-folder option 224.
CREATING A CONNECTION A connection between the network management system and a 3rd-party application is established by creating a connection file that stores information about the connection. To create a connection file, a user selects the ADMIN option 204e, Management Connection sub-option 208a, and the "Create" option 216a within control tree 203.

Figure 3A:
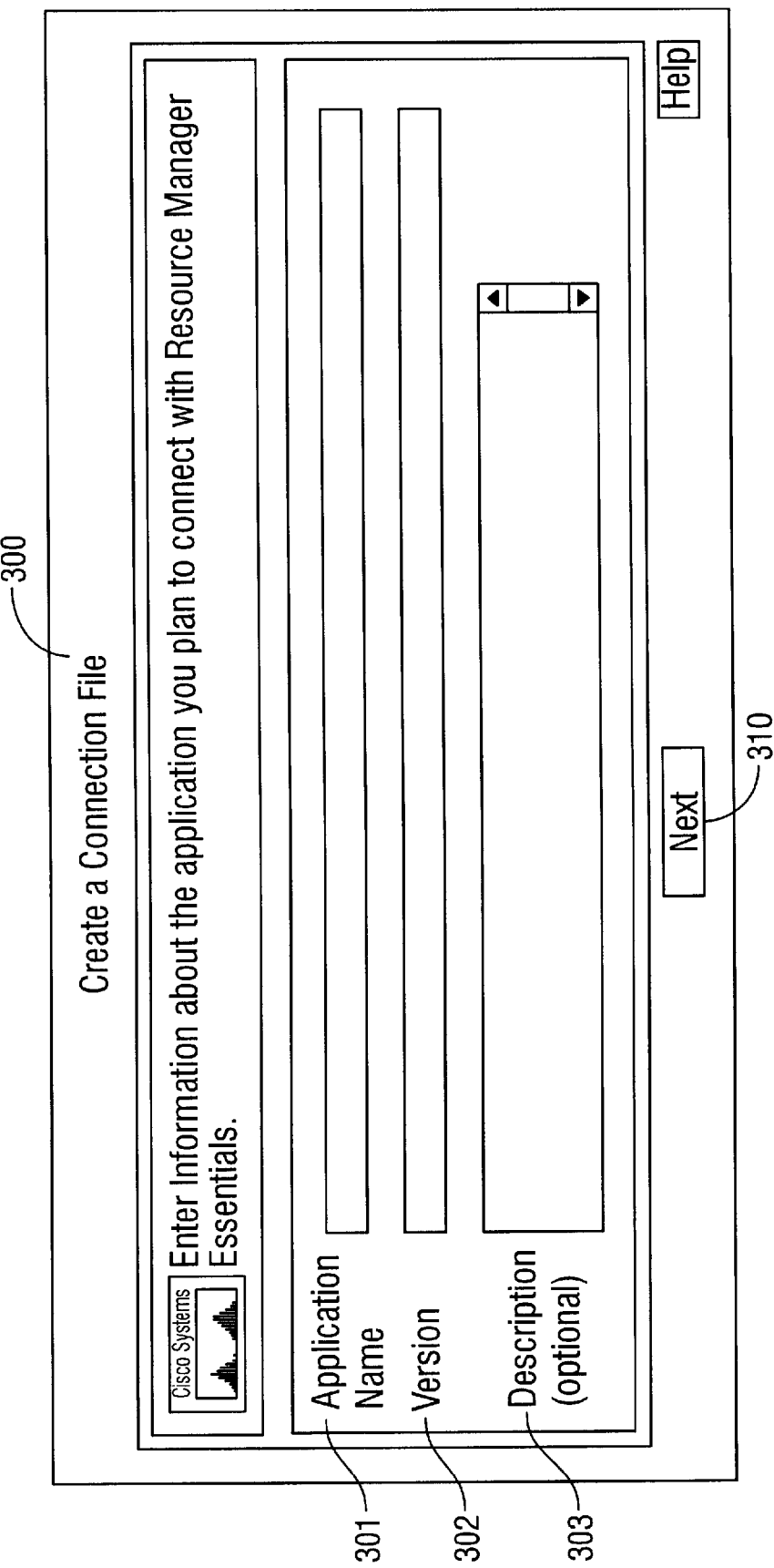
FIG. 3A illustrates a "Create A Connection File" dialog box.

In response, network management system 102 displays a "Create a Connection File" dialog box 300, as illustrated in FIG. 3A, in main pane 210 of FIG. 2A. Dialog box 300 includes an Application Name field 301, Version 302, and Description field 303. The user may enter a name of the 3rd-party application in the Application Name field 301, a version number, and a description for the connection file that the user is about to create, in fields 301, 302, and 303 respectively. After entering this information, the user selects the "Next" button 310 to continue.

Figure 3B:
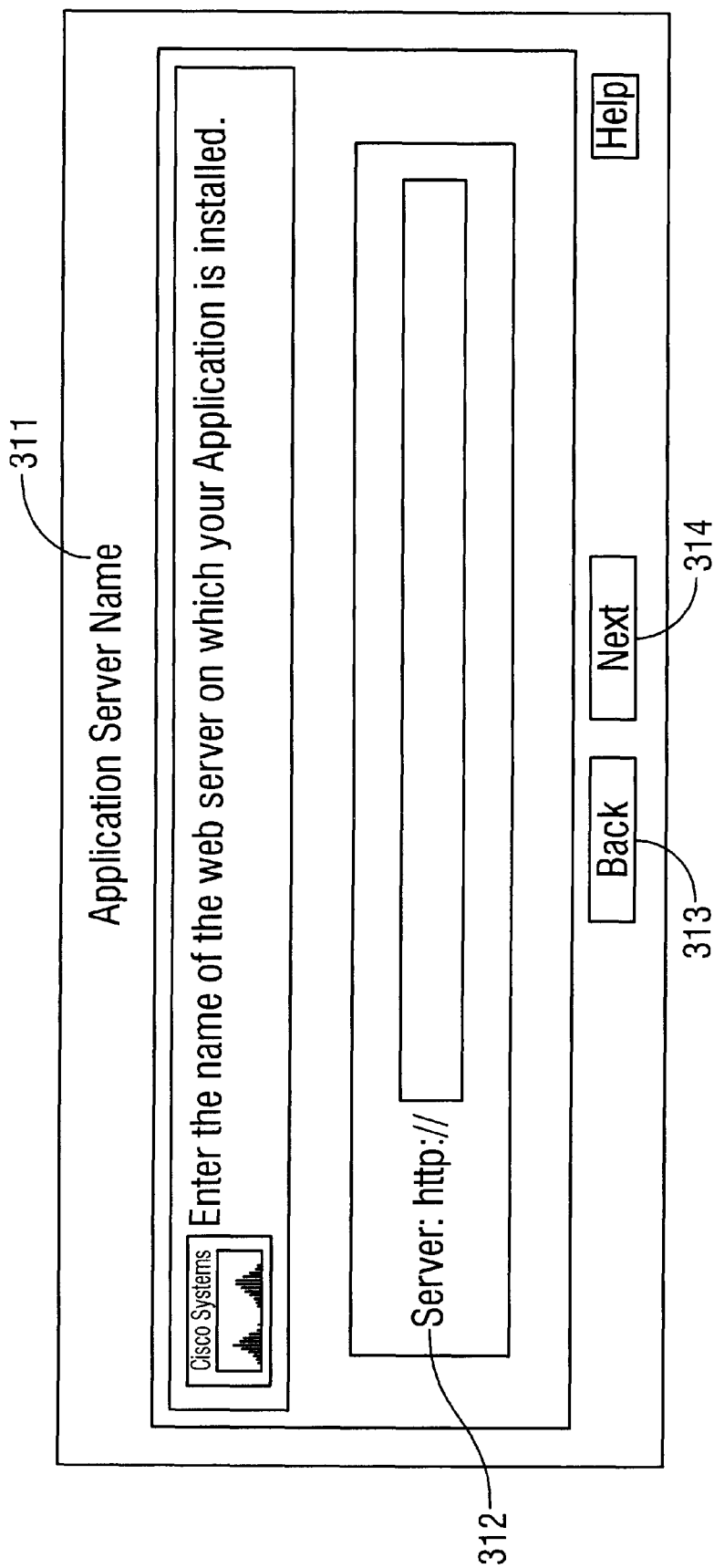
FIG. 3B illustrates an "Application Server Name" dialog box.

In response, the browser sends the entered information over the Web to the network management system 102. The network management system causes the browser to display an "Application Server" dialog box 311, as illustrated in FIG. 3B, in pane 204 of FIG. 2A. Dialog box 311 includes a Server Name field 312. The user may optionally enter the name of a Web server on which the user's copy of the 3rd-party application is installed in field 312 and may then press the NEXT button 314. In response, Management Connection function of the network management system tests whether the entry for "application server name" is a fully-qualified URL. An example of a fully-qualified URL is "http://www.cisco.com". The user also may select the "Back" button 313 to return to the previous dialog box to make changes.

Figure 3C:
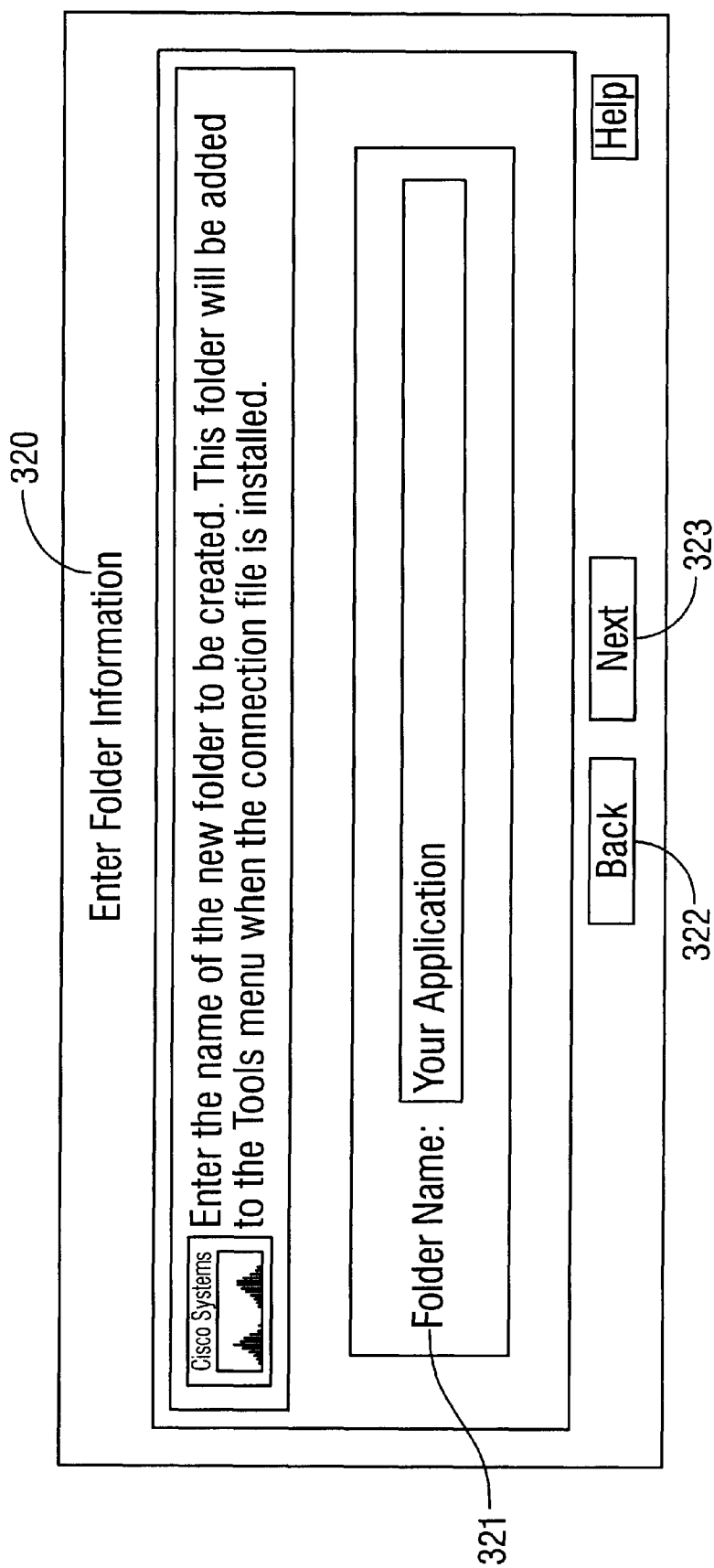
FIG. 3C shows an "Enter Folder Information" dialog box.

If the user's entry is a fully-qualified URL, then in response, the network management system causes the browser to display an "Enter Folder Information" dialog box 320, as illustrated in FIG. 3C. Dialog box 320 includes a Folder Name field 321. The user enters the name of a new folder to be created within the control tree 203 for the target application. In the example of FIG. 3C, the name of the folder is "Your Application". The default name for the folder is the name and version number of the application, example, "Application Name, 1.0". The user may then select NEXT button 323. In response, network management system 102 modifies a registry or similar data structures that define the form and contents of the control tree 203, by inserting information about "Your Application" that should be displayed as part of the TOOLS option 204d. Thereafter, information describing "Your Application" will be displayed as part of a third party applications list 226 of TOOLS option 204d, as shown in FIG. 3B. Preferably, modification of a registry or similar data structures occurs after the user enters all the support information required by stepping through the "Create a Connection File" dialog boxes. The modification occurs only after the user selects the "Finish" button as explained below.

When the user selects button 323 of dialog box 320, the network management system displays an "Enter Item Information" dialog box 330, as illustrated in FIG. 3D. Dialog box 330 comprises an Item Name field 331, a URL field 332, and may also include a display options list 333, having one or more check boxes. The user may enter information relating to the folder "Your Application" in the fields of dialog box 330.

For example, in Item Name field 331, the user may enter the name of the item to appear under the "Your Application" folder. In URL field 332, the user may enter the URL of the item identified in Item Name field 331. Normally the URL will correspond in some way to the fully-qualified URL that was entered previously. Using the display options list 333, the user may select which classes of users can access the item identified in 331. For example, in an embodiment, the network management system defines five (5) classes of users including Help Desk personnel, Approvers, Network Operators, Network Administrators, and System Administrators. Each class has successively greater rights and privileges in working with the system. Thus, using display options list 333, the user may selectively assign rights in the application to different user classes.

To proceed, the user selects the "Next" button 334. In response, the network management system 102 tests the URL that the user entered in URL field 332 by calling the URL through the browser. If the browser cannot reach the specified URL, the network management system 102 displays an error message, and the user is returned to dialog box 330 so that the user may correct or re-enter the URL information. Otherwise, network management system 102 displays a "Verify Item Information" dialog box, which displays all the information that the user has entered for an application, and prompts the user to verify the information. At this point, the user may change the information by returning to the relevant previous screen. To add another 3rd-party application and its corresponding folder or to compartmentalize the different functions of the same $3^{rd}$-party application, the user may select a "More Folders" button and repeat the above steps, starting at the "Enter Folder Information" dialog box. When there are no more folders to be added, the user may select a "Next" button. In response, network management system 102 displays an "Application Support Information" dialog box. The user may enter company name and support contact information for their application, and select a "Finish" button to persistently store the information.

When the above steps for creating a connection between the network management system and a $3^{rd}$-party application are carried out, data captured from the user and data representing the connection are stored in a data directory for future reference and use. In one embodiment, a help page containing information about the $3^{rd}$-party application is generated from the captured data and installed in a help directory. In addition, a help mapping file entry is generated for the new help page and is installed in a help mapping file.

For each URL that has been defined, registry files that define the contents of the control tree are updated to call the network management system's wrapper script using that URL and a location identifier of the help page as arguments. The registry files are modified to reference the help mapping file entry to link the $3^{rd}$-party application help page to the network management system's help system. Further, timestamps in "Update" areas of the registry files are modified; this forces the network management system to re-read the registry files and become aware of the $3^{rd}$-party application that has been linked to it.

These steps represent an example of linking an external application or into a network management system, but the specific steps are not critical. What is important is that an external application is linked to the network management system automatically and transparently.

WORKING WITH PREVIOUSLY-CREATED CONNECTIONS

IMPORTING CONNECTIONS

In the preferred embodiment, a connection previously created by another entity may be imported into network management system 102 at Customer Installation 100a.

Referring to FIG. 2A, Management Connection folder 205 of control tree 203 includes an "Import" option 216b, with which a user may import a ready-made connection file that was previously created.

Figure 3E:
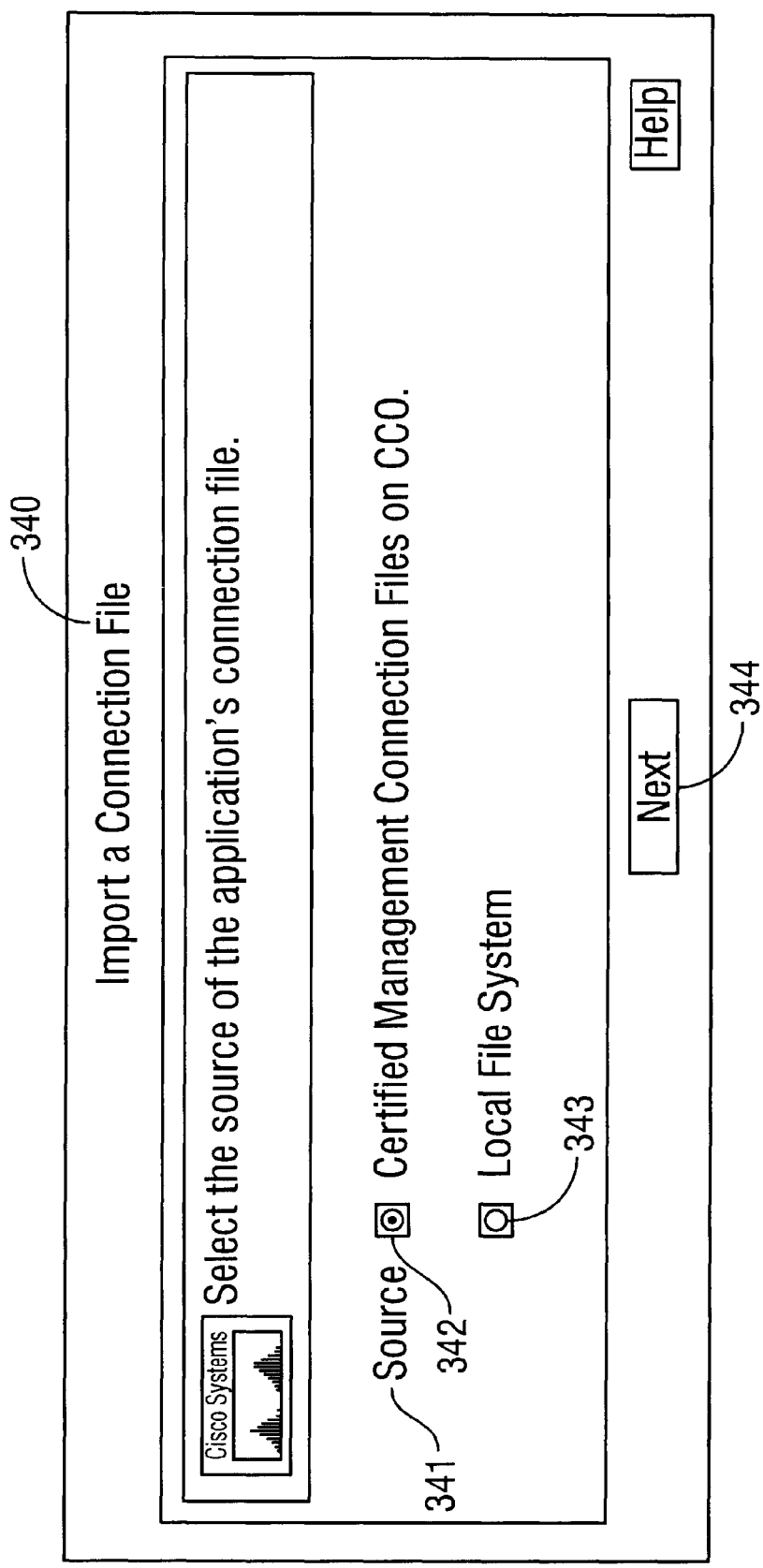
FIG. 3E shows an "Import a Connection File" dialog box.

Selecting the "Import" option 216b causes network management system 102 to display a "Import A Connection File" dialog box 340, as illustrated in FIG. 3E, in pane 204 of FIG. 2A. Dialog box 340 includes Source radio buttons 341 that enable the user to indicate the logical source from which a connection is to be imported. For example, dialog box 340 has a first radio button 342 labeled "Certified Management Connection Files on CCO" and a second radio button 343 labeled "Local File System." Thus, the user may import a connection either from the set of Certified Management Connection Files stored at Company Site 110, or from a local file system such as the file system of the user's workstation, e.g., from local disk storage. In this illustration, the user selects Certified Management Connection Files on CCO as the logical source and then selects the "Next" button 344.

Figure 3F:
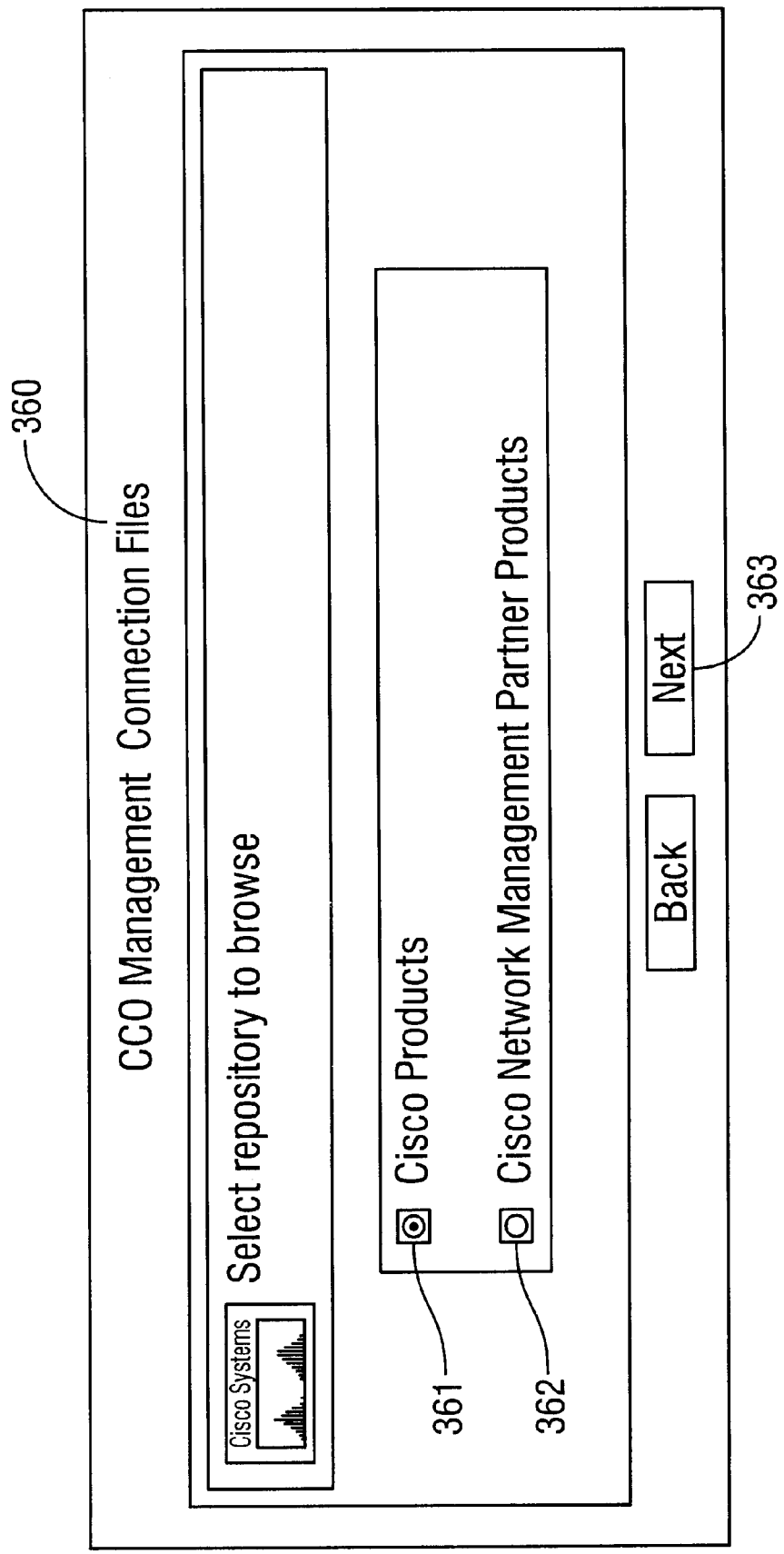
FIG. 3F shows a "CCO Management Connection Files" dialog box.

In response, network management system 102 displays a "CCO Management Connection Files" dialog box 360, as illustrated in FIG. 3F. Dialog box 360 may include one or more radio buttons 361, 362 that may be used to indicate a location ("repository") within a larger logical source from which the system should obtain connection information. For example, dialog box 360 includes a "Cisco Products" radio button 361 and a "Cisco Network Management Partner Products" radio button 361 that respectively indicate two types of connections. By selecting one type of connection, in response, the system will display a list of existing or known connections that are classified in that type. To select a type of connection, the user may select the "Next" button 363.

In response, network management system 102 displays a "Select Management Connection File" page 366, as illustrated in FIG. 3G. Page 366 comprises a message header 380, a column header 382, and a list 384 of connections that have been certified for integration with the network management system. Message header 380 comprises a message that informs the user about the contents of page 366. Column header 382 includes a descriptive label for a plurality of columns of information that are included in list 384. The columns may include a company name column 386, application name column 388, and a connection file link column 389. In one embodiment, a particular connection within list 384 may be selected by clicking a mouse cursor on a connection file link that is illustrated in connection file link column 389. In this example, the user selects connection 368, which identifies the application "HP OpenView Network Node Manager."

Figure 3H:
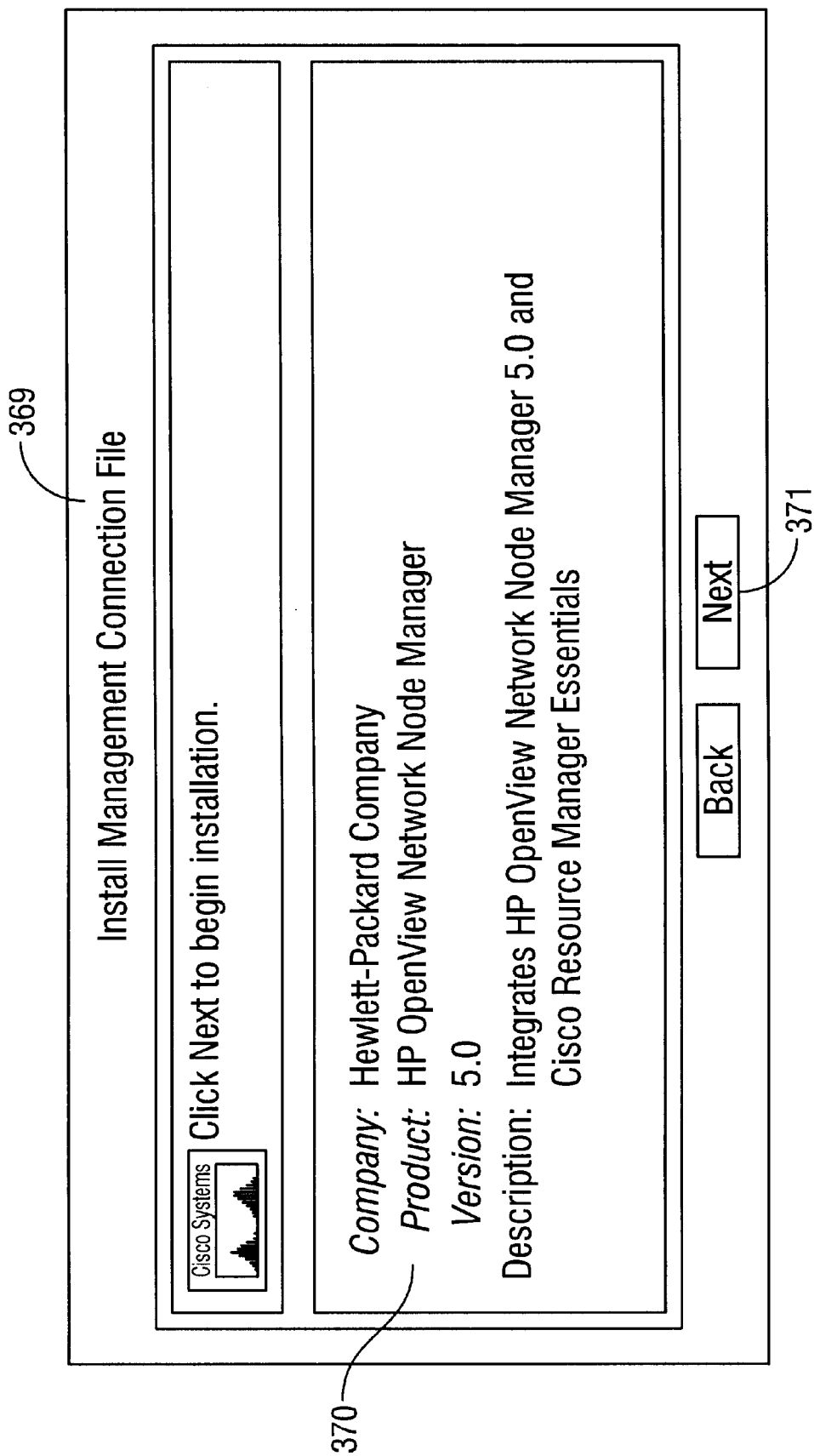
FIG. 3H shows an "Install Management Connection File" dialog box.

In response, network management system 102 displays a "Install Management Connection File" dialog box 369, as illustrated in FIG. 3H. The "Install Management Connection File" dialog box 369 displays information about the target application in pane 370. If this information is deemed acceptable, the user then selects the "Next" button 371 to install the connection file.

Figure 3I:
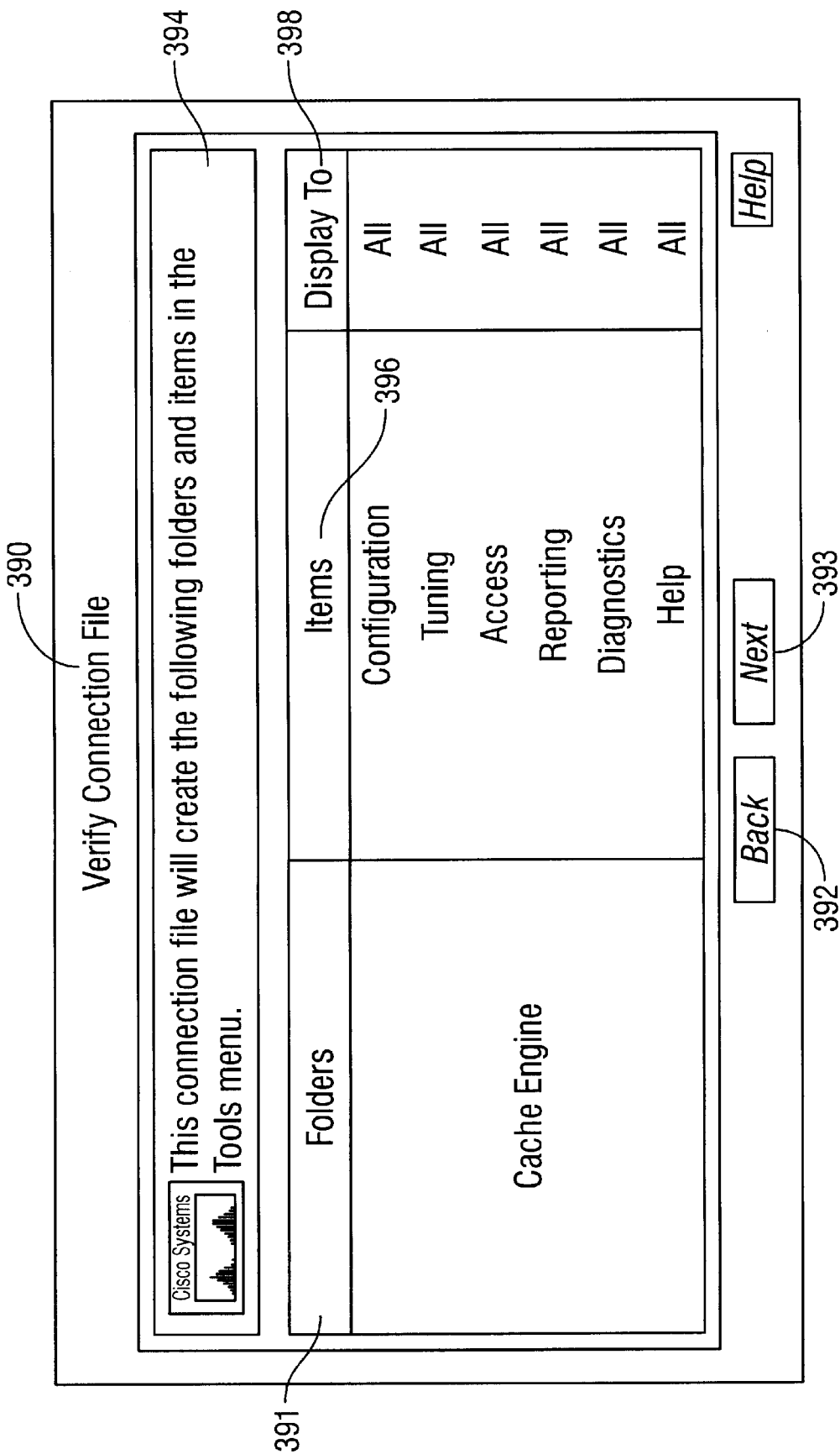
FIG. 3I shows a "Verify Connection File" dialog box.

In response, a "Verify Connection File" dialog box 390 is displayed by network management system 102, as shown by FIG. 3I. Dialog box 390 comprises a message header 394, a Folders column 391, an Items column 396, and a Display column 398. Folders column 391 displays a list of folders that will be added to the TOOLS option of the control tree 203 of the network management system 102. For each folder listed in Folders column 391, the Items column 396 lists items within each folder that will be added to the TOOLS option of the control tree 203, below the specified folder. The Display column 398 identifies the classes of users that are permitted to view each item. In this case, the designation "ALL" indicates that all classes of users may see each item.

The user then selects the "Next" button 393 to continue installation. In one embodiment, if the connection file has installation notes, then network management system 102 displays an "Install Notes" dialog box and the installation notes in the form of text. The installation notes provide the user with additional information to install and run the third-party application.

If a server name is required, the "Application Server Name" dialog box 311 of FIG. 3B is displayed. The user may then enter the name of the server on which the application is installed. A server name is not required if a fully qualified URL was previously entered when this connection file was previously created. If a server name is not required, then the "Application Server Name" dialog box 311 would not be displayed.

ACCESSING A LINKED APPLICATION

If installation is successful, network management system 102 displays a "Connection File Installed" dialog box (not illustrated in this document). The user may update the TOOLS option with the new folder and items in the control tree 203 by selecting the "Update Menu Now" button (not illustrated in this document). Alternatively, the user may choose to restart the browser later to update the menu.

When installation is complete, a name and link to the installed 3rd-party application will appear in the control tree 203, from which it can be directly executed or linked to.

Figure 4:
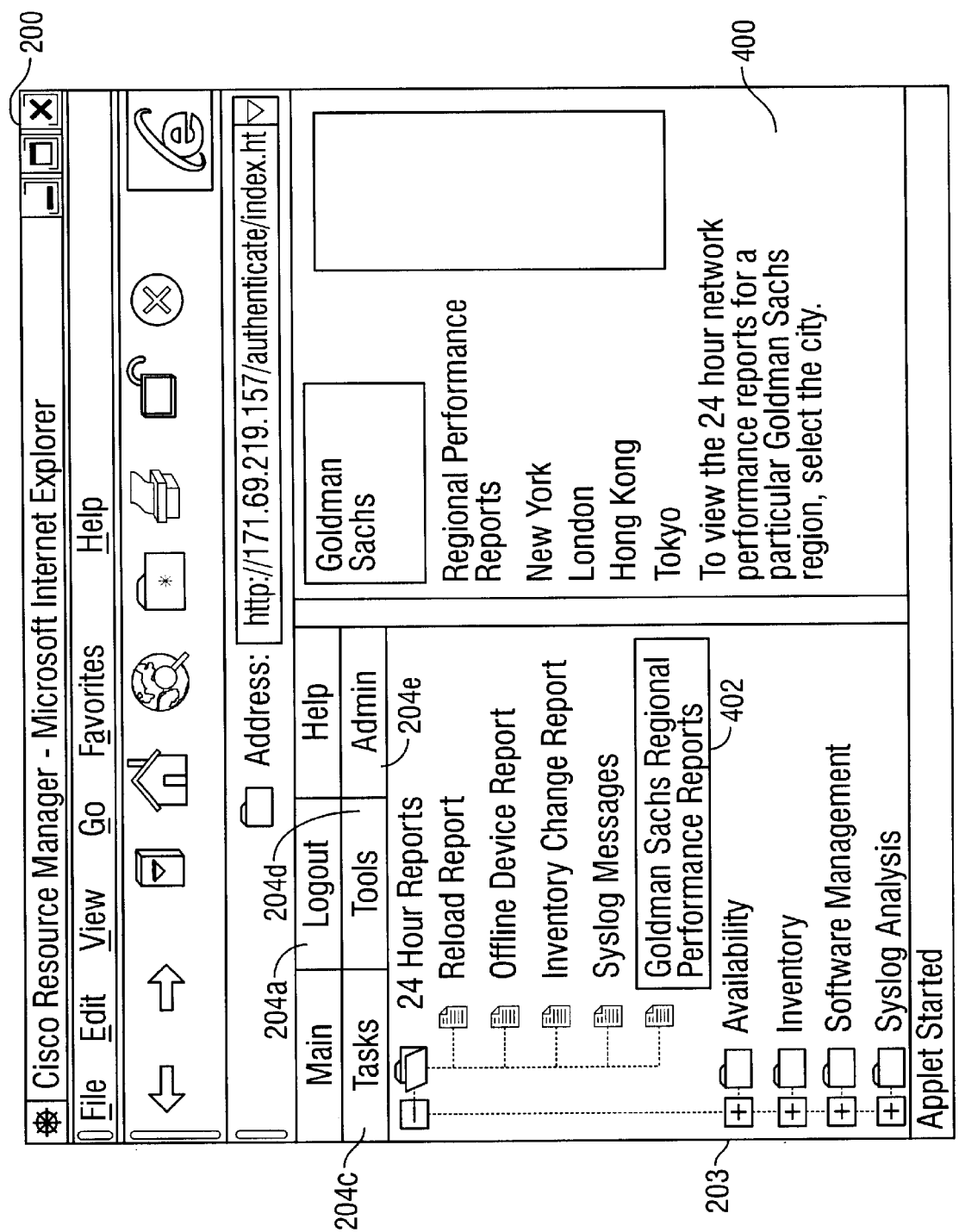
FIG. 4 illustrates an exemplary graphical user interface of a resource manager application offering options relating to the linking external information.

FIG. 4 is a diagram of a display 400 that is generated by an external application program named "Goldman Sachs Regional Performance Reports" that has been linked to a network management system. In this example, the connection of the 3rd-party application has caused the network management system to modify its TASKS option 204c to include a new sub-option 402. The new sub-option 402 identifies the external application. The new sub-option 402 is a direct link to an external executable application, or a link to a Web site associated with that application. The installation process handles all aspects of interconnecting the external application to the network management system. The external application may be executed by selecting the new sub-option 402. In response, the network management system loads and executes the associated external application program, or redirects the Web browser to a link that is associated with the new sub-option 402.

When the external application executes, all information that it displays is shown on a separate browser window created by the network management system for the linked external application. In an alternate embodiment, the information that the external application displays is shown within the main pane 210 of the graphical user interface generated by the network management system. Thus, the network management system frames or contains the display of the external application and retains overall control of the user's interaction with the host computer system.

MODIFYING EXISTING LINKS TO APPLICATIONS

Once an application link is active, the user may modify the link. An example of modification is that the user may decide to change the URL for the application link, or hide an application link.

Figure 5A:
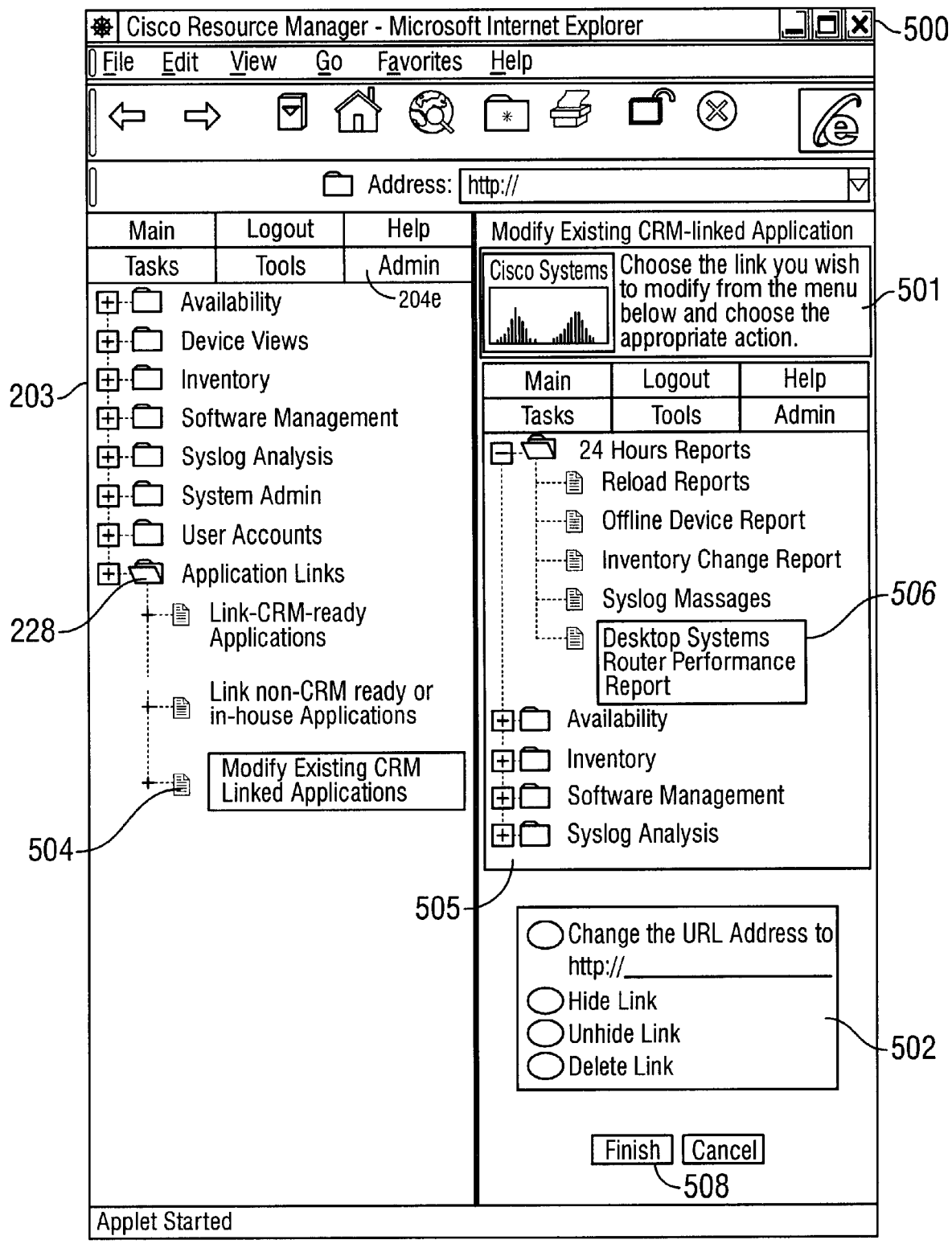
FIG. 5A shows a Modify Application page.

Referring to FIG. 2A, Management Connection folder 205 includes a MODIFY option 216e. To modify a link, the user selects the MODIFY option 216e. In another embodiment, the user selects the ADMIN option 204e, the Application Links folder 228, and the Modify Existing CRM Linked Applications sub-folder option 504, as shown in FIG. 5A. In response, network management system 102 generates the display 500 of FIG. 5A, which comprises a message box 501, application list 505, and a selection of modification actions in pane 502.

Message box 501 describes how to select a connection to modify. Application list 505 is a list of one or more application links that have been previously connected to the network management system. The application list 505 is displayed in a form that duplicates a portion of the control tree 203 so that the user may retain a sense of context. The user selects one of the applications from application list 505, for example, application 506, named "Desktop Systems Router Performance Report."

The user may then select the type of modification to carry out from pane 502. In one embodiment, the available actions include: Change URL Address; Hide Link; Unhide Link; Delete Link. Each action is associated with a radio button that may be selectively activated by the user. When an action is selected, the user may select the FINISH button 508 to make the requested action occur.

In one embodiment, for external or third-party connections, only the server name can be modified. For example, for connection files marked "Certified", only the server name can be modified. For connection files that were created by the user ("local connection files"), the user can modify the server name, folder name(s), item name(s), item URLs, display mode, and help contact information. The user may also add or delete items and folders from the package. Any change other than the server name will cause the package version number to be incremented. Items and folders of network management system 102 cannot be modified.

INTERNAL REPRESENTATION OF CONNECTIONS

CONNECTION FILE FORMAT

In one embodiment, information about each connection between a 3rd-party application and the network management system is stored in a connection file. In the preferred embodiment, each connection file is a data file that conforms to Extensible Markup Language (XML). The data collected using the dialog boxes that are described above is stored in a set of XML tags in XML data files. Extensible Markup Language is a pared-down version of Standard Generalized Markup Language ("SGML"), which is a system for organizing and tagging elements in a document. Thus, XML enables designers to create their own customized tags.

In the preferred embodiment, each connection file contains tags that have the format set forth in Table 1.

TABLE 1

CONNECTION FILE TAG FORMAT

```
<linkdef VERSION="1.0">
<package VERSION="pkgvrs" TYPE="pkgtype">
<foundry NAME="company name" ADDRESS="company addr"
    PHONE="phone info">
<product NAME="product name" VERSION="prod version string"
    SERVER="server name">
<proddescr> "product description string" </prodDescr>
<instnotes> "product installation noes" </instNotes>
<support EMAIL="support email addr" HREF="product home page">
    </support>
<menu NAME="menu button or drawer name">
<folder NAME="folder name" OPENICON="icon name"
    CLOSEDICON="icon name" HELPURL="help url">
<item NAME="item name" ICON="icon name" HREF="item url"
    HELPURL="helpurl">
<security ROLE="role"> </security>
"A textual description of the item can be contained here".
</item>
</folder>
</menu>
</product>
</foundry>
</package>
</linkdef>
```

An example of a hypothetical, complete XML data file is set forth in Table 2.

TABLE 2

EXAMPLE CONNECTION FILE

```
<linkdef VERSION="1.0">
<PACKAGE version="1.0" TYPE="1">
<FOUNDRY name="Karen Corporation" ADDRESS="1234 Main
    Street\nSomewhere,CA 90000-0000\nUSA\n"PHONE="1-900-123-
    4567\nFax: 800-123-4567\n">
<product NAME="Network Data Masher" VERSION="1.0"
    SERVER="http:www.cisco.com">
<proddescr> "Network Data Masher collects data from each device within
    an enterprise network, mashes it together, and displays output."
    </proddescr>
<instnotes> "To install Network Data Masher, follow these installation
    notes."</instnotes>
<support EMAIL="sales@cisco.com"
    HREF="http://wwwin.cisco.com"></support>
<menu NAME="Tools">
```

TABLE 2-continued

EXAMPLE CONNECTION FILE

```
<folder NAME="Network Data Masher by Karen Corp.">
<item Name="Collect Network Data" HREF=index.html">
<security Role="Operator"></security>
</item>
<item Name="Mash Data Together" HREF="http://www.yahoo.com">
<security Role="NO"></security>
<security Role="NA"></security>
</item>
</folder>
<folder NAME="Network Data Masher (Secure) by Karen Corp.">
<item Name="Collect Secure Network Data"
    HREF="http://www.yahoo.com">
<security Role="Operator"></security>
</item>
<folder>
</menu>
</product>
</foundry>
</package>
</linkdef>
```

INTERNAL DATA MODEL

Also in the preferred embodiment, an XML data file that describes a connection, along with meta-information that network management system 102 needs to establish a connection, may be organized in a Package and stored in database 111.

Preferably, Packages of XML data files corresponding to the connection files are uniquely identified by the combination of Company Name, Product Name, and Product Version. A Package Type is based on where the package came from. For example, if a package is downloaded from Company Site 110, then the type is designated as "certified". If the package was created locally, then the type is "local." The value of the package type determines the extent a package can be edited using the GUI explained in the previous sections above. For example, a value of "certified" would preclude editing, with the exception of server name.

Preferably, the XML data is converted into a Perl hash for ease of manipulation. The Perl hash is passed between Web pages of the system, by saving the values to hidden fields within an HTML page. Table 2 sets forth preferred names of hidden fields and definitions of their values. The fields correspond to names of fields in a Package. They may also correspond to column names in tables of database 111. In the examples, the numbers in parenthesis defines the maximum number of octets for the given field as limited by the user interface input fields.

TABLE 3

INTERNAL DATA MODEL

PKGVERS: majornum. minornum
PKGTYPE: Defines whether a package is local (L), imported (I), or Certified
    (C). This value is set by the at the time a package is created or imported.. It is
    used to determine how much of the package can be edited.
CRMVERS: CRM_version_string
PRODNAM: Third party application name string for display to customers. (80)
PRODVER: Third party application version string for display to customers; may
    contain target OS and browser information. (80)
PRODESC: Product description string for any additional information; may be
    left blank. (256)
COMPANY: The name of the company to contact for support of this product.
    (80)

TABLE 3-continued

INTERNAL DATA MODEL

COMADDR: Company Street Address, State, Country, Zip-code, each line
   separated by \n . . . (256)
HLPINFO: Phone, Fax, email, or any other appropriate support information,
   each line separated by \n. (256)
HLPMAIL: An optional e-mail address to use for support; this will be active on
   the displayed help page. (128)
HELPURL: An optional URL to use for support or contracting the company; this
   URL will be active in the help page display. If the URL is not fully qualified,
   the server name will be prepended . . . (256)
SVRNAME: Name of the web server to use for incomplete URL's. For published
   generic connection files, this filed will be blank and will be filled in at the
   customer installation. The server names is prepended to incomplete target
   item URL's. (128)
SVRDSCR: Any extra installation notes the package creator wants to display
   about their product.
FOLDERN: count of the number of folders defined in this package. This is
   simply to make parsing and package verification easier.
FOLDER1:
   menu:folder1:item1^item1URL^:item1SecList:item2^item2URL^item2SecList.
FOLDER2:
   menu:folder2:item1^item1URL^item1SecList:item2^item2URL^item2SecList.
. . .
FOLDER<FOLDERN>:menu:folder<folderN>:item1^item1URL^:item1SecList:
   . . .
PKG_END:

VARIATIONS, EXTENSIONS

The data model and file format described above are merely one exemplary way in which connections of an application to a network management system may be stored. The particular fields and formats described above are not required. Any method of internally representing, storing and manipulating similar data may be used.

INSTALLATION OF CONNECTION FILES

Figure 6A:
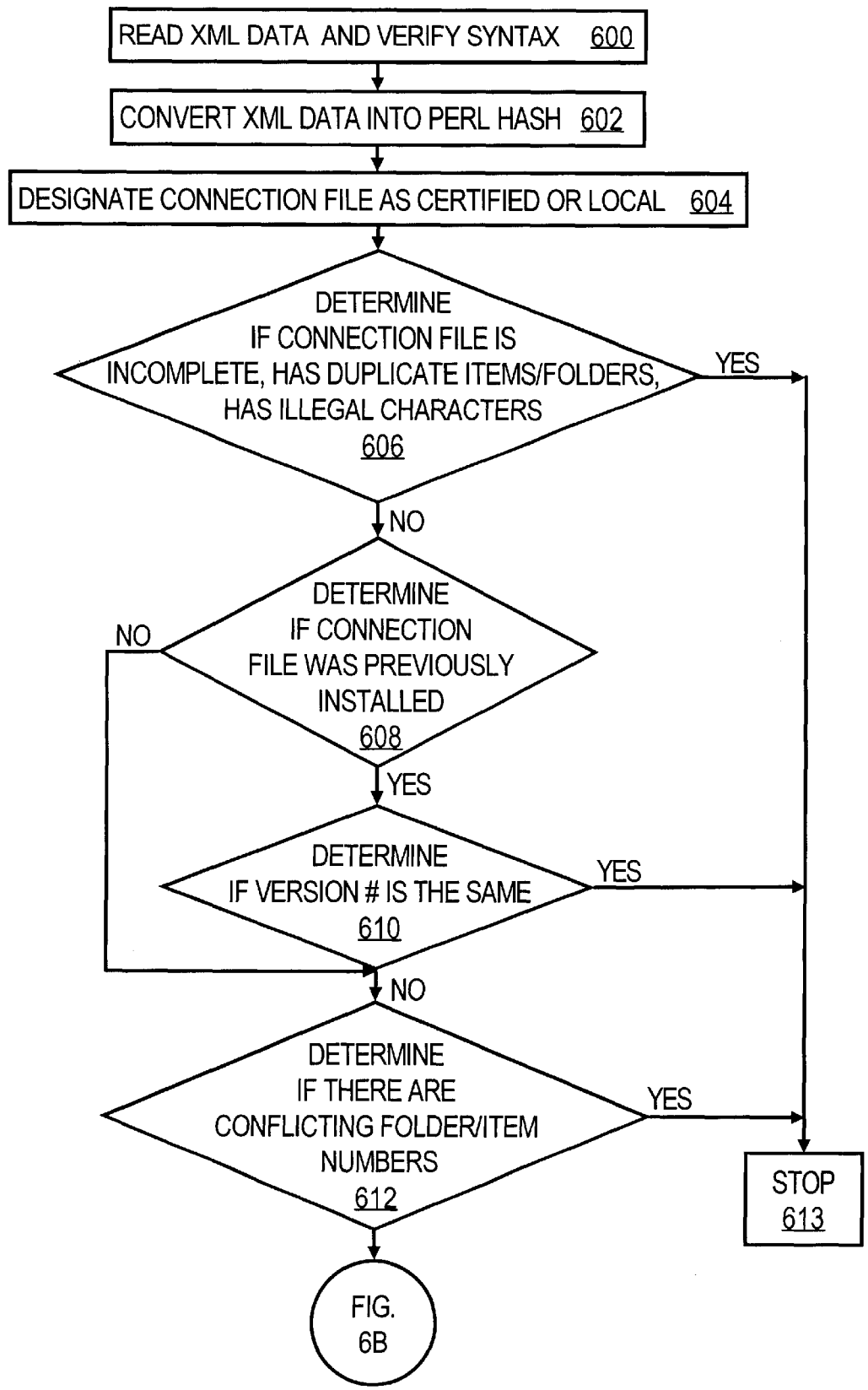
FIG. 6A is a flow chart of steps performed in installing a connection.
Figure 6B:
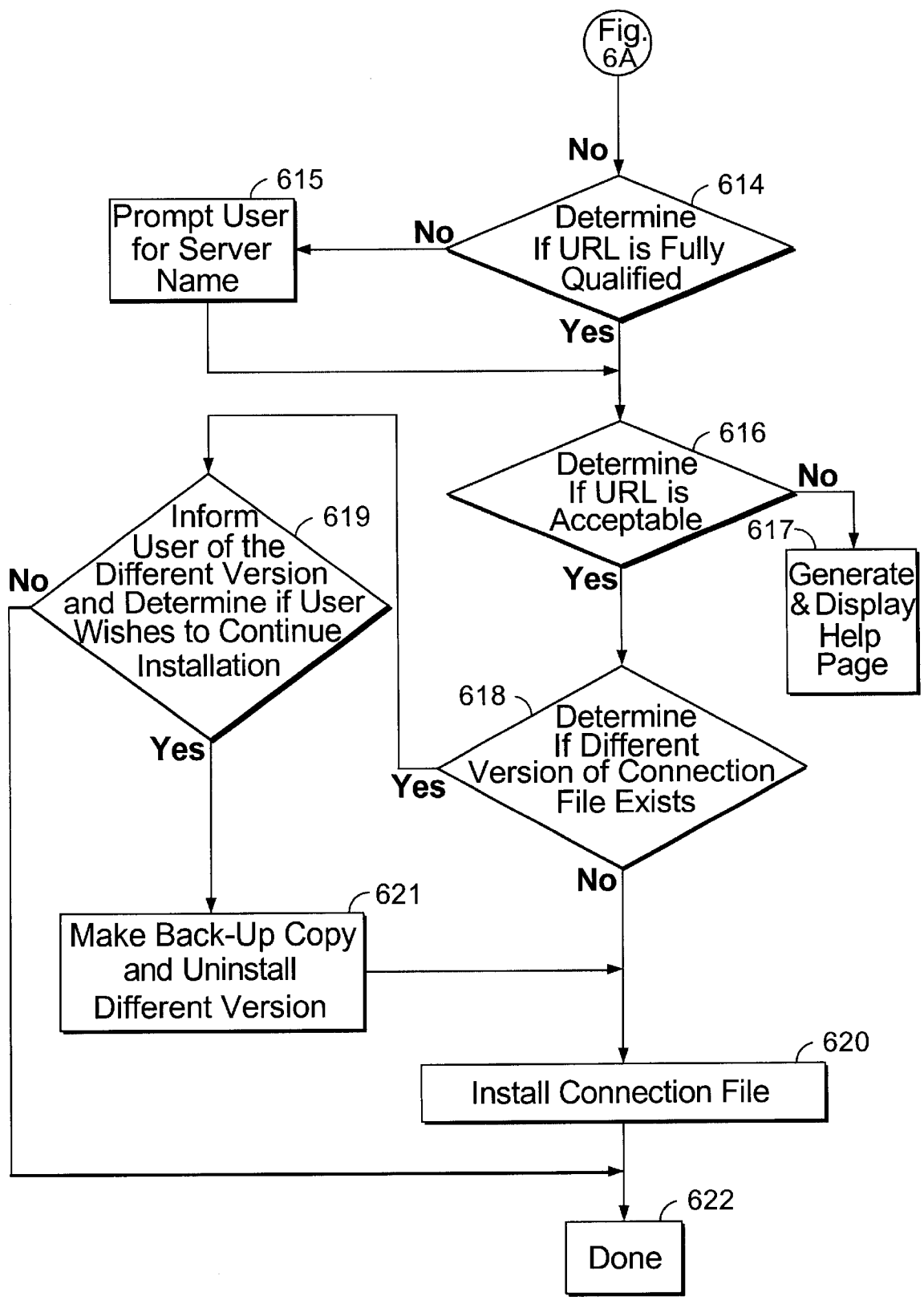
FIG. 6B is a flow chart of further steps involved in installation.

FIG. 6A and FIG. 6B are flow diagrams that illustrate a process of installing connection files in one embodiment. The steps of FIG. 6A and FIG. 6B will be described in terms of the preferred embodiment has been described above, however, the details of such an embodiment are merely exemplary, and are not required.

At block 600, the XML data of a Connection File is read, and checked for completeness and correctness with respect to syntax. At block 602, the XML data is converted to a Perl hash. At block 604, the connection file is designated as "certified" or "local," depending on the source of the connection file. If the connection file was read from Company Site 110, it is designated as a certified file. If the connection file was read from a local file system, it is designated as a non-certified file, unless it was it was previously marked as certified. The designation value is stored for later use, for example, to determine editing privileges.

At block 606, it is determined if the connection file is incomplete. In this context, a "complete" connection file will have at least one folder and item, and all the fields are filled, and at least one security level is specified for each item. Block 606 may also involve checking that there are no duplicate item or folder names within the connection file and that there are no illegal characters, such as commas and parentheses, in the item or folder names. Furthermore, block 606 may involve checking that the folder names and items in the connection file do not duplicate any folder names and items that have been previously instantiated in the control tree not resulting from a previously installed version of the same connection file. If the connection file is not complete or if there are duplicate names or illegal characters in the item or folder names, the installation process stops and an error may be reported, as shown by block 613.

If the tests of block 606 succeed, then at block 608, it is determined if the connection file was previously installed. If the connection file was previously installed, then at block 610, it is determined if the version number is the same as that of the connection file to be installed. If the version number is the same, control is passed to block 613 and the installation process stops.

If the tests of block 608 pass, then at block 612, it is determined if there are any conflicting folder or item names, by checking the names against any previously installed connection files, and also against the native RM control-tree folders and items. If there are conflicting names, then control passes to block 613 and the installation process is stopped.

Otherwise, at block 614, it is determined if the URL as specified in the connection file is fully qualified. If the URL is not fully qualified, then the user is prompted for the server name, as shown by block 615.

If the URL is fully qualified, then at block 616, it is determined if the URL is accessible over the World Wide Web. This test is considered a reasonable test of whether the application or document specified by the URL exists. Block 616 may involve opening an HTTP connection to the document specified by the URL and attempting an HTTP GET request. A URL is considered accessible if the system does not receive an HTTP error code in response to the HTTP GET request. If the URL is not accessible, then at block 617, a help page containing company information and information on how to obtain product assistance is generated and displayed.

At block 618, it is determined if a different version of the connection file has been previously installed. If no different version exists, the current connection file is installed at block 620. If a different version was previously installed, then at block 619, a message is displayed to inform the user of the existence of the different version, and the user is asked if he wishes to continue with the installation. If the user wishes to continue with the installation, then a back-up copy of the different version of the connection file is made, and the different version is uninstalled at block 621. Control then passes to block 620 where the current connection file is installed. If at block 619, the user does not wish to continue with installation, then control passes to block 622.

ADDITIONAL FUNCTIONS

Other embodiments may include additional features and functions.

EXPORTING CONNECTIONS

In one embodiment, a mechanism provides for the export of connection information to other locations.

For example, using EXPORT option 216d, a 3rd-party developer can include a copy of a connection file in the install package for a particular application. As another example, a business enterprise or other entity can share an internally defined connection file among multiple Customer Installations 100.

DEVICE CENTER ACCESS

In another embodiment, the system includes a mechanism that enables a user to access a Device Center of the network management system from within a 3rd-party application.

In this embodiment, the system has a Device Center Wrapper, which is an application program interface that allows a user to access a Device Center of the network management system 102 from within a 3rd-party Web-based application. For example, a third-party application can connect to the Device Center of the network management system 102 and may pass in device context information that should be used for all reports from the Device Center.

Assume that the user is working with device "fred.cisco.com" from within the third-party application "HP OpenView." The user may wish to click on the device name and go to all reports available in the network management system without having to start from the top and re-enter the device information. An IPAddress or DeviceName value is used as input for the Device Center Wrapper. The Device Center Wrapper converts the input value to a database ID number, and then calls the Device Center screen with the context of that device ID. The $3^{rd}$-party application can reference this URL in the following format:

```
http://essentials-server>cgi-
bin/common/perl/launchPad/deviceCenter.pl?csUser=
autoLogin&DeviceName=host.domain
or
http://essentials-server>cgi-
bin/common/perl/launchPad/deviceCenter.pl?csUser=
autoLogin&IPAddress=nnn.nnn.nn.nn
```

In the above example, where the user is working with device "fred.cisco.com" from within the third-party application "HP Open View", the reference to the URL is of the form:

```
http://essentials-server>cgi-
bin/common/perl/launchPad/deviceCenter.pl?csUser=
autoLogin&DeviceName=fred.cisco.com
```

DEVICE FINDER

Yet another embodiment includes a mechanism that enables a user to call a device discovery mechanism of the network management system locally.

In one embodiment, a Device Finder Wrapper allows a user to call a Device Finder program of the network management system from the copy of the network management system 102 that is executing in the user's Intranet. In this way, the customer may obtain a list of devices that are in the network, and then directly pass the device list to a URL associated with a 3rd-party application.

The item definition of the XML data file may be:

```
<item NAME="My url name" HREF="http://myurl.com">
<preprocessor HREF="/devicefinder.html" Args="IPAddress=$IPADDR"
CGIDataType="Get">
</preprocessor>
<security Role="NO"></security>
</item>
```

The device finder in the network management system listed as "devicefinder.html" is called to obtain a device list in a CGI Get (query string) format. The device finder would then call the item URL to pass the device list using GGI format as follows:

http://myurl.com?IPAddress=1.2.3.4 where 1.2.3.4 is the ip address of the device the user selected.

In an alternate embodiment, a CGIDataType of "Post" can be specified. The device finder would create a hidden key in the post data called "IPAddress" with a value of "1.2.3.4", which the device finder passes to the item URL in Post format.

CONTEXTUAL CALLING

In one embodiment, the connection information specifies the types of context as well as the format in which the context information should be sent to the third party application. This is also known as Contextual Calling.

Figure 5B:
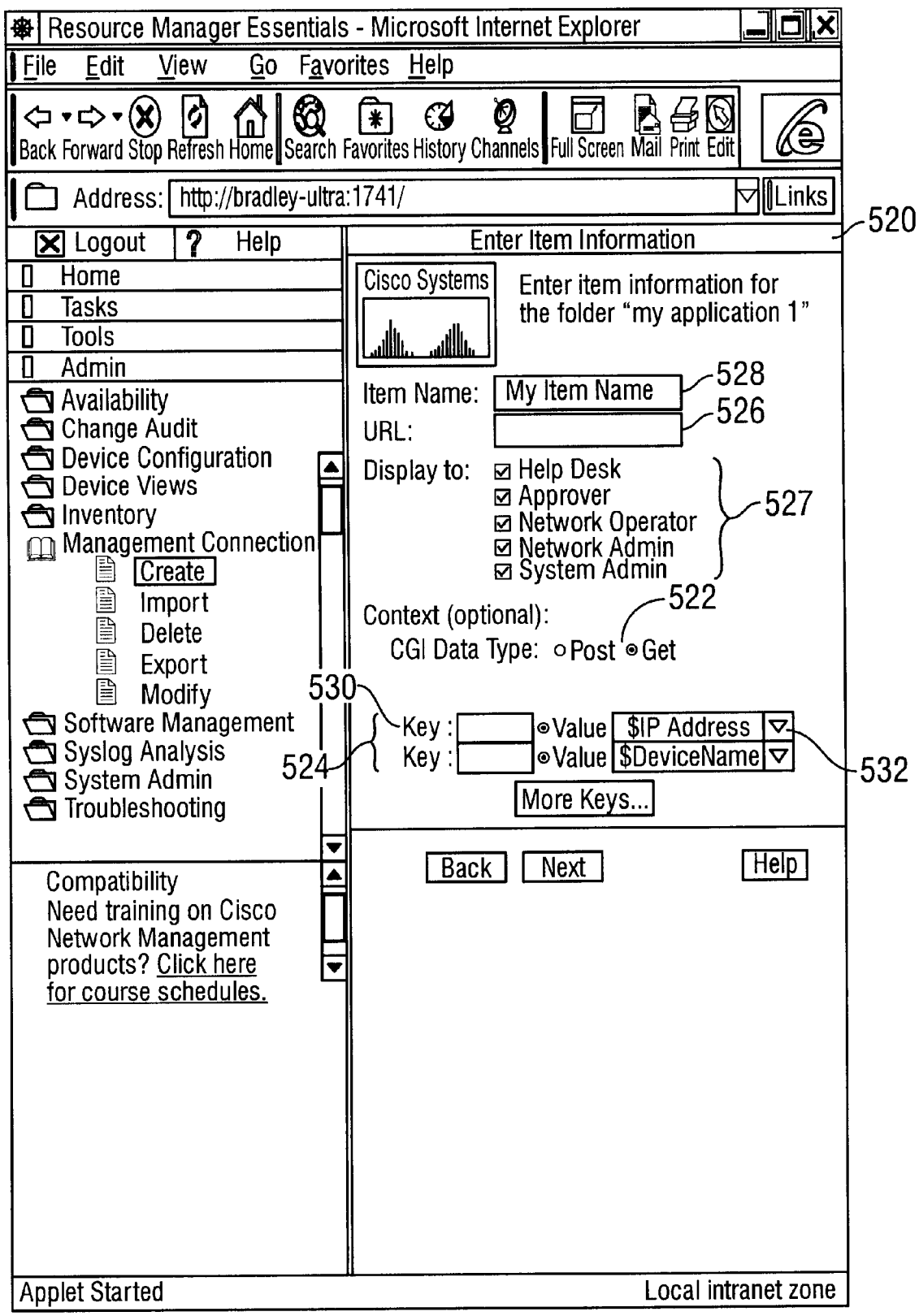
FIG. 5B shows an alternate representation of an "Enter Item Information" dialog box.

For example, the user may select information items from a set of known contextual items, including device name, IP address, device interface, port address, security levels. The user may select the manner in which the contextual item is passed as a key/value pair to a $3^{rd}$-party application URL. For example, the contextual item can be sent in a URL with query strings after it, or as a key/value pair with hidden query strings. FIG. 5B illustrates a display that allows a user to select the manner in which the contextual item is passed as a key/value pair to a URL application. Dialog box 520 of FIG. 5B is an alternate representation of the dialog box 330 of FIG. 3D. Dialog box 520 allows a user to enter contextual information, and includes CGI Data Type radio buttons and data entry fields for key-value pairs 524 comprising Key fields 530, and Value fields 532. Dialog box 520 also includes an Item name field 528, a URL field 526, and a display options list 527, having one or more check boxes. In the Item Name field 528 the user may enter the name of the item to appear under the "my application 1 "folder. In URL filed 526, the user may enter the URL of the item identified in Item name field 528, example "http://myurl.com". In Key field 530, the user may enter, as an example, "myKey" with a corresponding value tag of" $IPAddress" in the Value field 532.

If the user selects the IP address as 1.2.3.4 then the URL would be:

http://myurl.com?myKey=1.2.3.4 where 1.2.3.4 is the ip address of the device the user selected.

As another example, the user may specify that the user wants network management system 102 to display its Device Selector and request an end user to select one or more devices before going to the third-party application URL. The selected device information would be added to the target URL string in the format that the third-party application requires. For example, in the HP OpenView example given above, the target URL would be:

http://hpovapp.my.com?HPDeviceNameString=fred.cisco.com&IPAddress=1.2.3.4

The information stored in the connection file would specify that the target URL is "http://hpovapp.my.com", the device selector should be displayed before going to the target URL, and that the device information of "hostname" and "IP address" should be appended to the URL in the form:

HPDeviceNameString=<hostname> and IPAddress=<ipaddr>

The connection file would also specify that the information should be passed in CGI GET format, as opposed to POST data format. In this manner, there may be more complex inter-operation between management application without requiring changes to the target application.

GLOBAL CONNECTION UPDATER

Another embodiment features a way to update all connections at the same time.

In this embodiment, a Global Connection File Updater is provided as an item in the Management Connection folder in the control tree 203. The Global Connection File Updater carries out updating of all installed and certified connection files at one of the Customer Installations 100, if a newer version of those connection files is available from Company Site 110 for the same version of the product. The Global Connection File Updater carries out the updating by first making a list of file names and versions of all connection files currently installed at a customer installation site. The Global Connection File Updater then passes the list to a special URL at the Company Site 110, as key-value pairs in the post data. For example:

---

MaxFile: M
FILE1:" . . . url-encoded xml string including the company name, product name, and network management system file version number for file 1 . . . "
.
.
.
FILEM:" . . . url-encoded xml string including the company name, product name, and network management system file version number for file M . . . "

---

The Certified Published Connection Page 117 extracts the version numbers of the Certified Connection Files 118 from the database and compares the version number with that of the installed version. If the Certified Connection Files 118 have versions that are greater than the corresponding installed versions, then the Certified Published Connection Page 117 sends back to the network management system 102 an XML string in the following format:

---

MaxFile: N
FILE1:" . . . url-encoded xml string for file 1 . . . "
FILE2:" . . . url-encoded xml string for file 2 . . . "
.
.
.
FILEN:" . . . url-encoded xml string for file N . . . "

---

The network management system 102 reads the above post data and re-installs the relevant connection files at the customer installation 100 with the new version.

MULTIPLE CONNECTION INSTALLATION

Another feature may be a mechanism that allows a user to install multiple copies of the same connection information that is associated with a $3^{rd}$-party application on different servers owned or controlled by that user.

In one embodiment, the system provides Multiple Connection Installation, which allows a user to install multiple copies of the connection file for the same 3rd-Party Application at different servers of a Customer Installation 100*a*. When a user attempts to install an additional copy of a connection file, the system displays a message asking the user to confirm that the user intends to install an additional copy. If confirmation is received, the user is prompted for a new folder name for the connection file to be installed. The name of the new folder is stored in an XML data file before the connection file is installed.

The connection file to be installed is assigned a sub-revision number to indicate that it is a second copy of an existing connection file. For example, if the first XML file has a revision number of 1.0, then the duplicate file will have a number of 1.1. If the user decides to delete a connection file after it has been installed, the user is prompted to enter the sub-revision number if there is more than one copy of the connection file.

REMOTE INSTALLATION

Another feature is a Remote Install Interface, which enables a link to a $3^{rd}$-party application program to reference a remote server.

In one embodiment, a Remote Install Interface enables installation of a link from network management system 102 to a remote server of the external application program 104. The installation may be carried out by calling a URL on the server that hosts network management system 102 and giving it the contents of a Connection File to install. The install routine of the remote application, using the Remote Install Interface, prompts the user for the port number and name of the server that hosts network management system 102, example, "http://bradley-ultra: 1174". In addition, the user may input login and password information for network management system 102. A remoter application, using a Remote Install Interface, calls a known URL in network management system 102 in order to perform the remote install. The Remote Install Interface passes remote installation information to network management system 102. For example, the Remote Install Interface may pass a Post data key-value pair to network management system 102. The key-value pair may contain a URL encoded XML data string for the connection file to be installed, and server name information if the URL is not fully qualified.

If a browser is used for the remote installation, then network management system 102 may prompt the user, using a dialog box, for the login name and password. Otherwise, the remote installer may provide a user name and password to the network management system 102 as encrypted data in key-value pairs. For example:

RMUser="Admin"
RMPass=". . . encrypted (or at least encoded) password . . . "

The remoteinstall.html page would verify the Post data and pass the XML data string to the existing AddPkg.pl script on the network management system 102 server to install the connection file.

DELETE option 216*c* may involve presenting a list of installed connection files for the user to choose. A user then selects one of the files. In response, links in the chosen package are displayed and user confirmation is requested. If confirmation is given, the connection file and all related changes are removed from the network management system 102 at the current Customer Installation 100.

CERTIFY CONNECTION

Another embodiment includes a CERTIFY CONNECTION FILE option and a VIEW CERTIFICATION STATUS option. The CERTIFY CONNECTION FILE option may involve logging into Company Site 110 and copying the contents of a specified connection file, excluding the local server name, to the Company Site for testing and certification using Fourth-Party Certification Tester 130.

CONNECTION TESTING

In still another embodiment, the Web Server 112 of Company Site 110 includes a management application program with functions that enhance and support network management system 102. For example, the Web Server 112 may include a Connection File Tester that verifies that the XML data received at Web Server 112 is complete, tests that folder names, item names, and package names are unique, as measured against in-progress, certified but non-published, and certified and published connection files. Preferably, previous versions of the same package are not included in the uniqueness tests. If a conflict occurs, an error message is displayed to the user via the browser running the graphical user interface of network management system 102

IN-PROGRESS CONNECTION ARCHIVER

The Web Server 112 may also have an In-Progress File Archiver that writes a connection file to an in-progress archive if the user has elected to carry out certification. This is accomplished by changing the state fields in the database at Company Site 110 to indicate that the file is in-progress. The Archiver may add appropriate information about the state of the certification, for example, whether the user desires to have published or non-published certification.

LINKS TO CERTIFICATION SITE

The Web Server 112 may also have links to the Certification Web Site 131 of the Certification Tester 130. Thus, if the user elects to go through certification, the Web Server 112 will direct the user to the Certification Web Site 130 for further processing and information gathering. The Web Server 112 may have a Connection File Publisher that compares a certified connection file to the version stored in the in-progress archive. If certification is approved, the Publisher may copy the certified connection file to either a published archive area or a non-published archive area.

The foregoing functions of Web Server 112 may also be provided in network management system 102 or in an external server or software element that cooperates with the foregoing elements.

HARDWARE OVERVIEW

Figure 7:
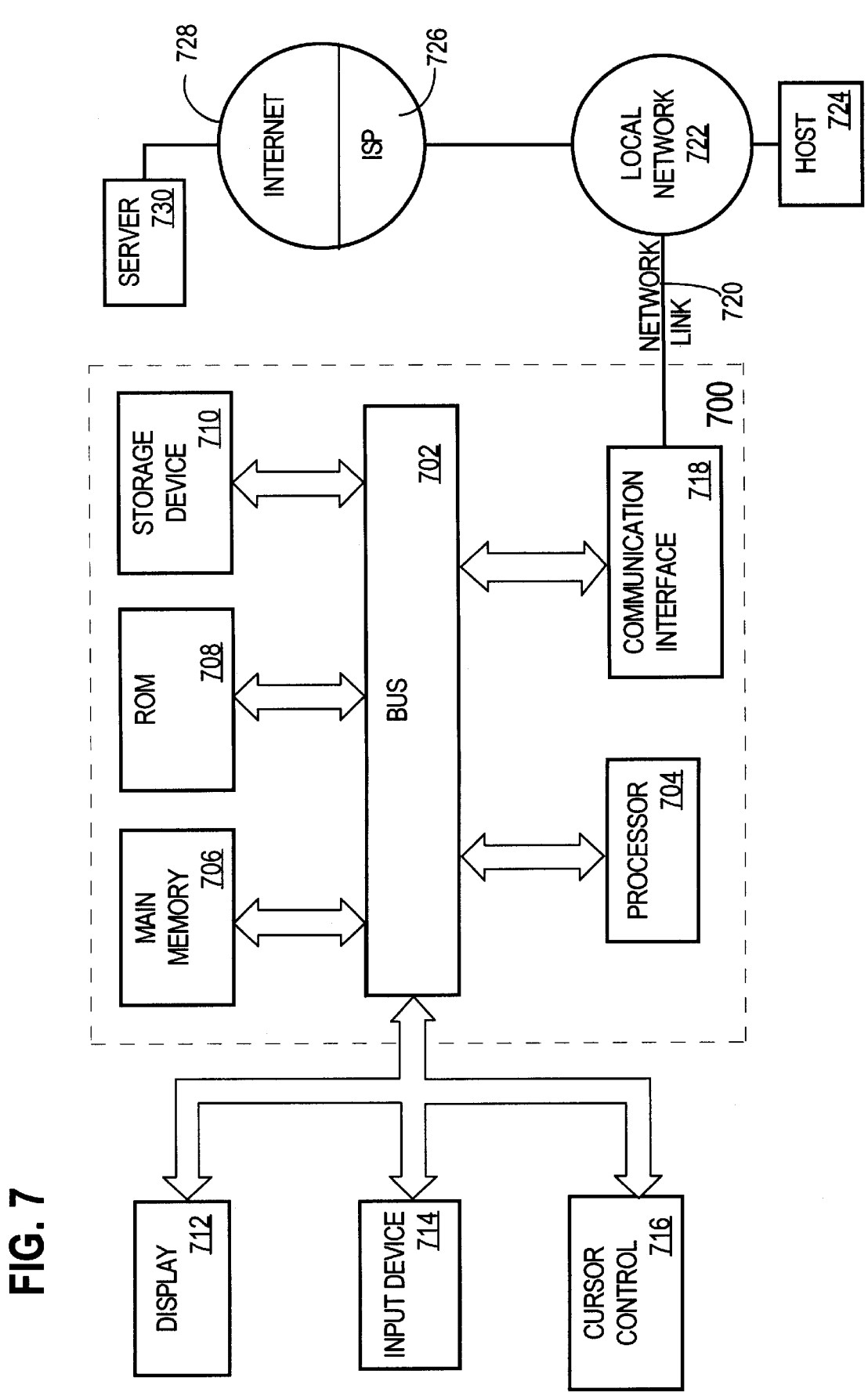
FIG. 7 illustrates a computer system on which an embodiment may be implemented.

FIG. 7 is a block diagram that illustrates a computer system 700 upon which an embodiment may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for linking external information to a network management system. According to one embodiment, linking external information to a network management system is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for linking external information to a network management system as described herein.

The received code may be executed by processor 704 as it is received, and/or stored in storage device 710, or other non-volatile storage for later execution. In this manner, computer system 700 may obtain application code in the form of a carrier wave.

ADVANTAGES, EXTENSIONS, VARIATIONS

A mechanism, method and system for connecting third-party application programs to an installed network management system have been described. Numerous advantages over prior approaches will be apparent. For example, using the exemplary graphical user interface that has been described, it is possible for a third-party marketing program manager to enter basic information about an application program. The information may be published worldwide in a way that enables customers to easily link from the network management system to the third-party application. Also, the information will work with successive, different versions of the network management system, without re-entry of the information.

The connection information is stored in a standardized format in a file that can be manipulated, exported, imported, or sent for certification. Thus, involvement of a fourth-party Certification Tester effectively allows the third-party application developer, or the Company Site 110, to publish a connection for use by customers who have both network management system 102 and a copy of the third-party application. The database of certified connections also serves to manage the namespace of the folders and links that can be added to network management system 102, so that the folders and links are organized in a sensible and clear way.

In the foregoing specification, the invention has been described with reference to specific embodiments thereof. It will, however, be evident that various modifications and changes may be made thereto without departing from the broader spirit and scope of the invention. For example, while it has been convenient to discuss operation of embodiments within the context of the Internet or the World Wide Web, the invention is not limited to either context. Any network infrastructure may be used. The specification and drawings are, accordingly, to be regarded in an illustrative rather than a restrictive sense.

What is claimed is:

1. A method for linking an application program to a network management system for managing devices on a network and having a hierarchical list of menu options, in which the menu options are defined by registry information stored in association with the network management system, the method comprising the steps of:

creating and storing, in association with the network management system, connection information that defines a connection between the application program and the network management system;

modifying the registry information of the network management system to add the connection information such that the application program is identified in a logical location in the list; and executing the application program by selecting it from the list from within the network management system.

2. The method as recited in claim 1, wherein the step of creating and storing connection information comprises the steps of creating and storing a connection file that defines one or more application menu options of the application program and one or more locations within the hierarchical list of the network management system into which the application menu options are to be stored.

3. The method as recited in claim 1, further comprising the steps of:

certifying that the connection information will correctly integrate the application program with the network management system before carrying out the modifying step;

storing and distributing, in association with the connection information, certifying information that identifies the connection as certified.

4. The method of claim 1 wherein the step of creating and storing connection information comprises the steps of:

creating and storing a connection data file, wherein the data file comprises data that ensures compatibility between the application program and the network management system and that defines one or more application menu options of the application program and one or more locations within the hierarchical list of the network management system into which the application menu options are to be stored.

5. The method recited in claim 2, further comprising the step of installing the connection file only when the connection file is certified.

6. The method recited in claim 2, further comprising the steps of installing the connection file only when a Uniform Resource Locator in the data file that specifies a location of the application program is found to exist.

7. The method recited in claim 3, wherein the step of certifying the connection information comprises the steps of:

transmitting the connection information to a site associated with an owner of the network management system;

at the site of the network management system, verifying that the connection file is complete; and storing the connection file and information concerning such verification in a database of the owner of the network management system.

8. The method recited in claim 7, wherein the step of certifying the connection further comprises the steps of:

transmitting the connection file to a Certification Tester; and if the connection file is certifiable, then creating and storing, in association with the connection file at the site of the owner of the network management system, information indicating that the connection file has been certified;

transmitting the connection file to a customer installation in association with the network management system; and installing the connection file in the network management system at the customer installation.

9. The method as recited in claim 1, wherein the step of creating and storing connection information comprises the steps of creating and storing connection information that defines one or more application menu options of the application program and one or more locations within the hierarchical list of the network management system into which the application menu options are to be stored and that defines one or more links into the application program that may be launched from within the network management system.

10. The method as recited in claim 1, further comprising the steps of:

displaying information generated by the application program within a frame of a graphical user interface that is generated by the network management system.

11. The method as recited in claim 1, further comprising the steps of:

selecting one or more application menu options of the application program from within the hierarchical list of the network management system; and displaying information generated by the application program within a frame of a graphical user interface that is generated by the network management system.

12. The method as recited in claim 1, further comprising the steps of:

creating and storing, in association with the network management system, connection information that defines a connection between the application program and the network management system, wherein the connection information may include: an application name; a location identifier of a server that hosts the application program; and a name of a menu option of the network management system through which functions of the application program are to be accessed.

13. The method as recited in claim 12, further comprising the steps of:

creating and storing, in association with the network management system, connection information that defines a connection between the application program and the network management system, wherein the connection information may include: an application name; a location identifier of a server that hosts the application program; a name of a menu option of the network management system through which functions of the application program are to be accessed; names of one or more items within the menu option through which sub-functions of the application program are to be accessed; and, for each of the items, one or more security privilege designations that indicate which users may access the associated item.

14. The method recited in claim 3, further comprising the step of: connecting the application program to the network management system by importing connection information from previously stored connection information, by selecting the connection information to be imported from the certifying information.

15. The method recited in claim 1, further comprising steps that carry out one or more functions from among the following:

global connection updating; exporting connections; device finding; accessing a device center; contextual calling; multiple connection installation; remote installation;

certifying connections; connection testing; archiving in-progress connections;

linking to a certification site.

16. A computer system for linking an application program to a network management system for managing devices on a network and having a hierarchical list of menu options, in which the menu options are defined by registry information stored in association with the network management system, the computer system comprising:

a company site associated with the network management system that comprises stored information identifying whether the application program is certified for use with the network management system;

an application developer site coupled over a network to the company site and which comprises stored connection information that defines a connection between the application program and the network management system; and one or more software elements stored and executing at the company site and the application developer site, wherein the software elements cooperate to carry out the steps of:

modifying the registry information of the network management system to add the connection information such that the application program is identified in a logical location in the list; and executing the application program by selecting it from the list from within the network management system.

17. The system recited in claim 16, further comprising:

a Certification Tester site coupled over the network to the company site and which comprises means for testing and certifying whether the connection information operates correctly with the network management system, and means for communicating, in response thereto, certification information from the Certification Tester site to the company site.

18. The system recited in claim 16, wherein the software elements cooperate to carry out the further steps of:

communicating the stored connection information from the application developer site to the company site;

at the company site, verifying that the connection information is complete.

19. The system recited in claim 16, wherein the software elements cooperate to carry out the further steps of:

updating the information stored at the company site when the Certification Tester site communicates the certification information to the company site.

20. The system as recited in claim 19, wherein the stored connection information comprises one or more application menu options of the application program and one or more locations within the hierarchical list of the network management system into which the application menu options are to be stored.

21. A computer-readable medium carrying one or more sequences of instructions for linking an application program to a network management system for managing devices on a network and having a hierarchical list of menu options, in which the menu options are defined by registry information stored in association with the network management system, wherein execution of the one or more sequences of instructions by one or more processors causes the one or more processors to perform the steps of:

creating and storing, in association with the network management system, connection information that defines a connection between the application program and the network management system;

modifying the registry information of the network management system to add the connection information such that the application program is identified in a logical location in the list; and executing the application program by selecting it from the list from within the network management system.

* * * * *